United States Patent
Ishikawa et al.

(10) Patent No.: US 8,548,254 B2
(45) Date of Patent: Oct. 1, 2013

(54) IMAGE DIRECTION JUDGING DEVICE, IMAGE DIRECTION JUDGING METHOD AND IMAGE DIRECTION JUDGING PROGRAM

(75) Inventors: Masumi Ishikawa, Tokyo (JP); Akio Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 995 days.

(21) Appl. No.: 12/308,051

(22) PCT Filed: Jun. 5, 2007

(86) PCT No.: PCT/JP2007/061351
§ 371 (c)(1),
(2), (4) Date: Jan. 7, 2009

(87) PCT Pub. No.: WO2007/142227
PCT Pub. Date: Dec. 13, 2007

(65) Prior Publication Data
US 2009/0297038 A1    Dec. 3, 2009

(30) Foreign Application Priority Data
Jun. 7, 2006    (JP) .................................. 2006-158253

(51) Int. Cl.
*G06K 9/00* (2006.01)
(52) U.S. Cl.
USPC ............................. 382/217; 382/186; 358/488
(58) Field of Classification Search
USPC ......................................... 382/209, 173, 186
See application file for complete search history.

(56) References Cited

U.S. PATENT DOCUMENTS

| 4,926,490 | A | * | 5/1990 | Mano ............................. 382/177 |
| 5,031,225 | A | * | 7/1991 | Tachikawa et al. ........... 382/185 |
| 6,577,763 | B2 | * | 6/2003 | Fujimoto et al. .............. 382/199 |

(Continued)

FOREIGN PATENT DOCUMENTS

| JP | 08-138024 | 5/1996 |
| JP | 10-224596 | 8/1998 |

(Continued)

OTHER PUBLICATIONS

S. Akamatsu, "Computer Recognition of Human Face—A Survey-," Transactions of the Institute of Electronics, Information and Communication Engineers, vol. J80:8, pp. 1215-1230, Aug. 1997.

(Continued)

*Primary Examiner* — Hadi Akhavannik
(74) *Attorney, Agent, or Firm* — Foley & Lardner LLP

(57) ABSTRACT

Up and down directions of an image are to be precisely judged without a special equipment installed in an image pickup device. An object candidate detecting means detects object candidates from an input image and their angles in the input image. A similarity calculation means calculate the degree of similarity between each detected object candidate and each object stored in advance. An input image angle calculating means judges up and down directions of the input image based on the calculated similarity of each object candidate and the angle of the input image. The input image angle calculating means carries out weighting for the angle of each object candidate in the input image based on its similarity and calculates slant angles with respect to the up and down directions of the input image by using the weighted angles.

25 Claims, 17 Drawing Sheets

INPUT IMAGE EXAMPLE

EXAMPLE OF ROTATION IMAGE GROUP

| IDENTIFIER OF ROTATION IMAGE | ROTATION ANGLE | IDENTIFIER OF OBJECT CANDIDATE | ANGLE IN INPUT IMAGE OF OBJECT CANDIDATE |
|---|---|---|---|
| Q1 | 10° | α | -10° |
| Q1 | 10° | σ | -10° |
| Q2 | -30° | β | 30° |
| Q3 | -7° | γ | 7° |

(56) References Cited

U.S. PATENT DOCUMENTS

| | | | |
|---|---|---|---|
| 6,804,414 B1* | 10/2004 | Sakai et al. | 382/289 |
| 8,077,973 B2* | 12/2011 | Dong | 382/186 |
| 2003/0048930 A1* | 3/2003 | Mihara et al. | 382/118 |
| 2003/0185424 A1* | 10/2003 | Sato et al. | 382/118 |
| 2004/0001614 A1* | 1/2004 | Russon et al. | 382/117 |
| 2004/0042663 A1* | 3/2004 | Yamada | 382/217 |
| 2004/0161149 A1* | 8/2004 | Kaneda et al. | 382/181 |
| 2005/0027511 A1* | 2/2005 | Ohguro | 704/9 |
| 2005/0265606 A1* | 12/2005 | Nakamura | 382/218 |
| 2006/0018544 A1* | 1/2006 | Ohguro | 382/181 |

FOREIGN PATENT DOCUMENTS

| | | |
|---|---|---|
| JP | 11-225283 | 8/1999 |
| JP | 2000-067156 A | 3/2000 |
| JP | 2005-184685 A | 7/2005 |
| JP | 2005-260870 A | 9/2005 |
| JP | 2006-079533 A | 3/2006 |

OTHER PUBLICATIONS

Y. Iwai et al., "A Survey on Face Detection and Face Recognition," Technical Report by Information Processing Society, CVIM-149, 2005, pp. 343-368.

* cited by examiner

INPUT IMAGE EXAMPLE

REGISTERED IMAGE EXAMPLE

FIG. 8
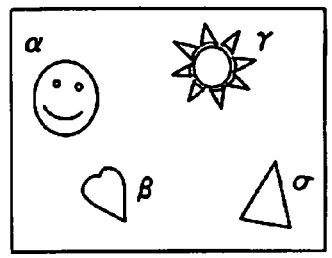
INPUT IMAGE EXAMPLE
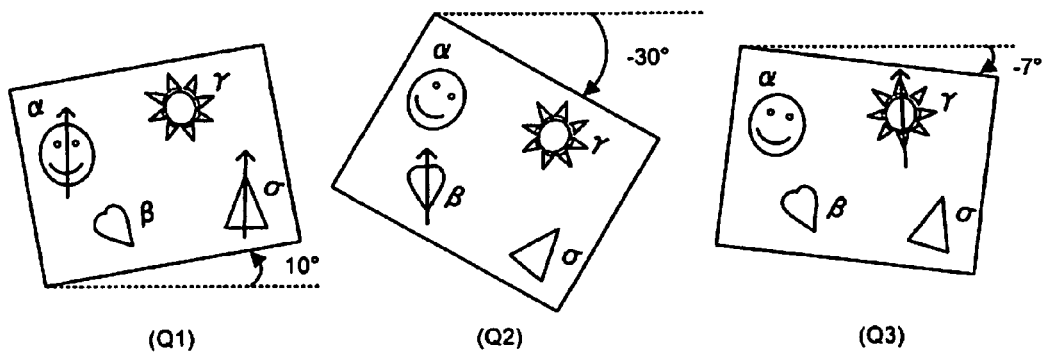
(Q1)   (Q2)   (Q3)
EXAMPLE OF ROTATION IMAGE GROUP
| IDENTIFIER OF ROTATION IMAGE | ROTATION ANGLE | IDENTIFIER OF OBJECT CANDIDATE | ANGLE IN INPUT IMAGE OF OBJECT CANDIDATE |
|---|---|---|---|
| Q1 | 10° | α | -10° |
| Q1 | 10° | σ | -10° |
| Q2 | -30° | β | 30° |
| Q3 | -7° | γ | 7° |

IMAGE DIRECTION JUDGING DEVICE, IMAGE DIRECTION JUDGING METHOD AND IMAGE DIRECTION JUDGING PROGRAM

APPLICABLE FIELD IN THE INDUSTRY

The present invention relates to an image direction determining device, an image direction determining method, and an image direction determining program for determining an up-and-down direction of an image, and more particularly to an image direction determining device, an image direction determining method, and an image direction determining program for determining an up-and-down direction of an image captured with a digital camera etc.

BACKGROUND ART

One example of the conventional image direction determining device is described in Patent document 1. The technique described in the Patent document 1 is a technique of incorporating a slant detector into an electronic camera, and determining an up-and-down direction of an image by acquiring a slant of the camera at the time of capturing the image. As a configuration for this technique, the image direction determining device includes an electronic image acquiring device for acquiring an image, a rotation detector for detecting the rotation of the image acquiring device within a plane that is vertically rotated and generating a rotation output value that is almost equal to a 90 degree integer multiple from a reference position where the image acquiring device is located at a horizontal position, and a signal processor for generating a processed digital image signal based upon the rotation output value.

Further, one example of another image direction determining device is described in Patent document 2. The technique described in the Patent document 2 is a technique of detecting a human face from an input image and determining an up-and-down direction of the face as an up-and-down direction of the image. FIG. 19 is a block diagram illustrating a configuration example of the conventional image direction determining device described in the Patent document 2 etc. As shown in FIG. 19, the image direction determining device for determining an up-and-down direction of the image by employing an up-and-down direction of the face includes a camera image picking-up section 91 for capturing an image and outputting an image, a digital image signal processing section 92 for compressing the image, a storing section 93 for recording the compressed image, and a face recognizing/image processing section 95 for detecting a human face appearing on a subject image, determining the up-and-down direction of the face, and when a result of the determination demonstrates that the up-and-down direction of the face differs from that of the image, giving an instruction for rotating the image so that the up-and-down direction of the face and that of the image coincide with each other.

Further, in Patent document 3 is described the technique of, with regard to a character image, selecting a recognition candidate character based upon information of the number of the features that are not dependent upon a direction of the character extracted from the character image, rotating a dictionary data associated with the candidate character, and assuming the rotation angle, which is decided according to a degree of the coincidence with the feature data (a relative position of the localized shapes such as a closed-loop of a character, a crossing intersection of a character, a T-intersection of a character, and an endpoint of a character) dependent upon the direction of the character extracted from the character image, to be rotation angle information.

Patent document 1: JP-P1999-225283A (paragraph 0005, FIG. 1)
Patent document 2: JP-P2005-260870A (paragraphs 0012 to 0013)
Patent document 3: JP-P1998-224596A (paragraphs 0010 to 0013)

DISCLOSURE OF THE INVENTION

Problems to be Solved by the Invention

However, in the case of employing the technique described in the Patent document 1, the image acquiring device having no slant detector incorporated therein cannot perform an up-and-down determination. Further, so as to enable the up-and-down determination to be performed, it is necessary to incorporate the slant detector into the image acquiring device such as a digital camera, which causes a problem that the production of the image acquiring device demands an increase in a cost for performing the up-and-down determination of the image.

Further, the technique described in the Patent document 2 is not capable of performing an accurate determination because only the up-and-down direction of the face detected from the input image is utilized to determine the up-and-down direction of the image. The reason is that a possibility that an inaccurate up-and-down determination is performed based upon the face erroneously detected is high because, as a rule, a precision in the detection of faces is not high, and the erroneous detection of the faces is frequently made.

Further, the technique described in the Patent document 3, which is a technique of exclusively employing the character images, can be said safely to heavily rely upon helpful characteristics such as a high precision in which the character is cut out, and numerousness of characters being detected from a manuscript. Namely, for the technique of the Patent document 3, which is a technique of, when a degree of correspondence of one character cut out from the manuscript image with a comparison target is high to some extent, determining the up-and-down direction of the above character, it is indispensable that the candidate having a good condition is selected with a simple threshold process, the character, being a comparison target, can be detected numerously, and yet the precision in which the character is cut out is high.

However, a detection precision of the object in a general picture is not high, and further the number of the objects being detected is not numerous. For example, upon viewing the face as an object, a degree of coincidence of the feature thereof with the pre-stored feature is not high due to influences by expression or a direction of the face and illumination conditions, and further the number of the faces being detected is also fewer as compared with the number of characters extracted from the manuscript image. For this, it is difficult to select candidates having a good condition by employing a simple threshold process, and resultantly a possibility that the angle is determined from the candidate having a bad condition is high.

Further, the techniques of the Patent document 2 and the Patent document 3, which do not take into consideration the fact that different angles are selected from a plurality of the candidates, are not capable of correctly determining the direction of an image such as an aggregate picture.

Thereupon, an object of the present invention is to more accurately determining the up-and-down direction of the input image without incorporating the slant detector into the image acquiring device.

Further, specifically, the present invention has an object of providing an image direction determining device, an image direction determining method, and an image direction determining program such that the up-and-down direction can be accurately determined for any input image to which a limit is not put, for example, the general picture image without an additional cost for incorporating a special appliance (slant detector etc.) which aims at determining the up-and-down direction.

Means to Solve the Problems

The present invention for solving the above-mentioned problems, which is an image direction determining device for determining an up-and-down direction of an input image, is characterized in including: an object candidate detecting means (for example, an object candidate detecting means 101) for detecting an object having a fixed shape or arrangement, of which a constant angle can be detected from its shape or arrangement, as an object candidate from the input image; a similarity degree calculating means (for example, a similarity degree calculating means 103) for calculating a similarity degree between the object candidate extracted by the object candidate extracting means and a pre-stored registration object; and an up-and-down direction determining means (for example, an input image angle calculating means 104) for determining the up-and-down direction of the input image based upon an angle in the input image of the object candidate extracted by the object candidate extracting means, and the similarity degree calculated by the similarity degree calculating means.

Further, the image direction determining device may include a feature extracting means (for example, a feature extracting means 102) for extracting a feature of the object candidate detected by the object candidate detecting means based upon image information of an object candidate region within the input image, and the object candidate detecting means may detect a plurality of the object candidates from the input image, and may extract the angles in the input image of the detected object candidates, the similarity degree calculating means may compare the feature of each object candidate being extracted by the feature extracting means with that of the pre-stored registration object, thereby to calculate the similarity degree, and the up-and-down direction determining means may include an input image angle calculating means for giving a weight to the angle in the input image of each object candidate based upon the similarity degree to the registration object, thereby to calculating a slant angle with respect to the up-and-down direction of the input image.

Further, the object candidate detecting means, from a rotated image obtained by rotating the input image at a predetermined angle, may detect the object candidate of which the angle in the rotated image is 0 degree, and may calculate the angle in the input image of the object candidate, based upon the rotation angle of the rotated image at a moment of detection.

Further, the similarity degree calculating means may calculate the similarity degree for a combination of each object candidate extracted by the object candidate extracting means and each pre-stored registration object.

Further, the feature extracting means may extract a feature of which a value changes responding to a direction of the object, and the similarity degree calculating means may calculate the similarity degree by employing a feature being extracted by the feature extracting means, of which a value changes responding to a direction of the object.

Further, the input image angle calculating means, when the object candidate is not detected from the input image, may assume the slant angle with respect to the up-and-down direction of the input image to be 0 degree.

Further, the input image angle calculating means, when the object candidate has been detected from the input image, may calculate the slant angle with respect to the up-and-down direction of the input image based upon the angle in the input image of the object candidate of which the similarity degree to the pre-stored registration object becomes maximized.

Further, the input image angle calculating means, when the object candidate has been detected from the input image, may calculate the slant angle with respect to the up-and-down direction of the input image based upon an average of the angles in the input image of the object candidates of which the similarity degree to the pre-stored registration object is equal to or more than a predetermined threshold.

The input image angle calculating means, when the object candidate has been detected from the input image, may calculate the slant angle with respect to the up-and-down direction of the input image based upon the angles in the input image of the object candidates of which the similarity degree to the pre-stored registration object is equal to or more than a predetermined threshold.

Further, the input image angle calculating means, when the object candidate has been detected from the input image, may calculate the slant angle with respect to the up-and-down direction of the input image based upon an angle calculated by carrying out weighting for the angle in the input image of the object candidate based upon the similarity degree to the pre-stored registration object.

Further, the input image angle calculating means may assume the angle, out of 0 degree, 90 degree, 180 degree, and 270 degree, nearest to the calculated slant angle with respect to the up-and-down direction of the input image to be a slant angle with respect to the up-and-down direction of the input image.

Further, the object candidate detecting means may hold relative position information of a specific part of a predetermined object, and may detect the object candidate based upon a similarity between the held relative position information and relative position information of the specific part being detected from the input image.

Further, the object candidate detecting means may hold a feature of a predetermined object, and may detect the object candidate based upon a similarity between the held feature and the feature being extracted from the input image.

Further, the object candidate detecting means may hold the image including a predetermined object as a template, and may carry out template matching for the input image by employing the held template, thereby to detect the object candidate.

Further, the image direction determining device may employ the image of the pre-stored object as a template for detecting the object candidate.

Further, the image direction determining device may include a person feature storing means (for example, a feature storing section 122) for storing information indicative of a specific person as a registration object.

Further, the object candidate detecting means may detect a face candidate of the person as an object candidate.

Further, the object candidate detecting means may extract an angle that is formed by a perpendicular bisector of a straight line connecting an left eye and a right eye to a perpendicular direction as an angle in the input image of the detected face candidate of the person.

Further, the object candidate detecting means may include a person candidate detecting means for detecting a plurality of person candidates being included in the input image and extracting the angles in the input image of the detected person candidates, the feature extracting means may extract the feature of the person candidate detected by the person candidate detecting means, the similarity degree calculating means may calculate the similarity degree between the feature extracted by the feature extracting means and the feature of the pre-stored specific person for each person candidate detected by the person candidate detecting means, and the input image angle calculating means may calculate the slant angle with respect to the up-and-down direction of the input image based upon the angle in the input image of each person candidate extracted by the person candidate detecting means, and the similarity degree to the specific person calculated by the similarity degree calculating means.

The present invention for solving the above-mentioned problems, which is an image direction determining method of determining an up-and-down direction of an input image, is characterized in including the steps of: detecting an object having a fixed shape or arrangement, of which a constant angle can be detected from its shape or arrangement, as an object candidate from the input image; calculating a similarity degree between the extracted object candidate and a pre-stored registration object; and determining an up-and-down direction of the input image based upon an angle in the input image of the object candidate and the calculated similarity degree.

Further, the image direction determining method may includes the steps of: detecting a plurality of object candidates from the input image, and extracting angles in the input image of the detected object candidates; extracting a feature of each detected object candidate based upon image information of an object candidate region within the input image; comparing the extracted feature of each object candidate with the feature of the pre-stored registration object, thereby to calculate the similarity degree; and giving a weight to the angle in the input image of each object candidate based upon the similarity degree to the registration object, thereby to calculating a slant angle with respect to the up-and-down direction of the input image.

The present invention for solving the above-mentioned problems, which is an image direction determining program for determining an up-and-down direction of an input image, is characterized in causing a computer to execute the processes of: detecting an object having a fixed shape or arrangement, of which a constant angle can be detected from its shape or arrangement, as an object candidate from the input image; calculating a similarity degree between the extracted object candidate and a pre-stored registration object; and determining the up-and-down direction of an input image based upon an angle in the input image of the object candidate and the calculated similarity degree.

Further, the image direction determining program may causes the computer to execute the processes of: detecting a plurality of object candidates from the input image, and extracting angles in the input image of the detected object candidates; extracting a feature of each detected object candidate based upon image information of an object candidate region within the input image; comparing the extracted feature of each object candidate with the feature of the pre-stored registration object, thereby to calculate the similarity degree; and giving a weight to the angle in the input image of each object candidate based upon the similarity degree to the reg-istration object, thereby to calculate a slant angle with respect to the up-and-down direction of the input image.

An Advantageous Effect of the Invention

The present invention does not necessitate the appliance cost for determining an up-and-down direction at the moment of manufacturing the image acquiring device such as a digital camera. The reason is that the appliance for determining the up-and-down direction such as a slant appliance does not need to be incorporated into the image acquiring device.

Further, the present invention makes it possible to more accurately determine the up-and-down direction of the image. The reason is that a possibility that an inaccurate determination of the up-and-down direction is made based upon the object candidate erroneously detected is low because the object candidate having a high reliability is selected as an object from among the object candidates detected from the image, and the up-and-down direction of the image is determined based upon the slant angle calculated by utilizing the angle in the input image of the object candidate having a high reliability.

BRIEF DESCRIPTION OF THE DRAWINGS

FIG. 8 is an explanatory view illustrating an example of the data structure stored in an angle storing section 321 in the third embodiment.

[DESCRIPTION OF NUMERALS]

| | |
|---|---|
| 100 | data processing device |
| 101 | object candidate detecting means |
| 102 | feature extracting means |
| 103 | similarity degree calculating means |
| 104 | input image angle calculating means |
| 110 | image inputting device |
| 120 | storing device |
| 130 | outputting means |
| 205 | image converting means |
| 3011 | image rotating means |
| 3012 | one-direction object candidate detecting means |
| 440 | command inputting/outputting device |
| 550 | input image angle calculating program |

BEST MODE FOR CARRYING OUT THE INVENTION

Embodiment 1

Figure 1:
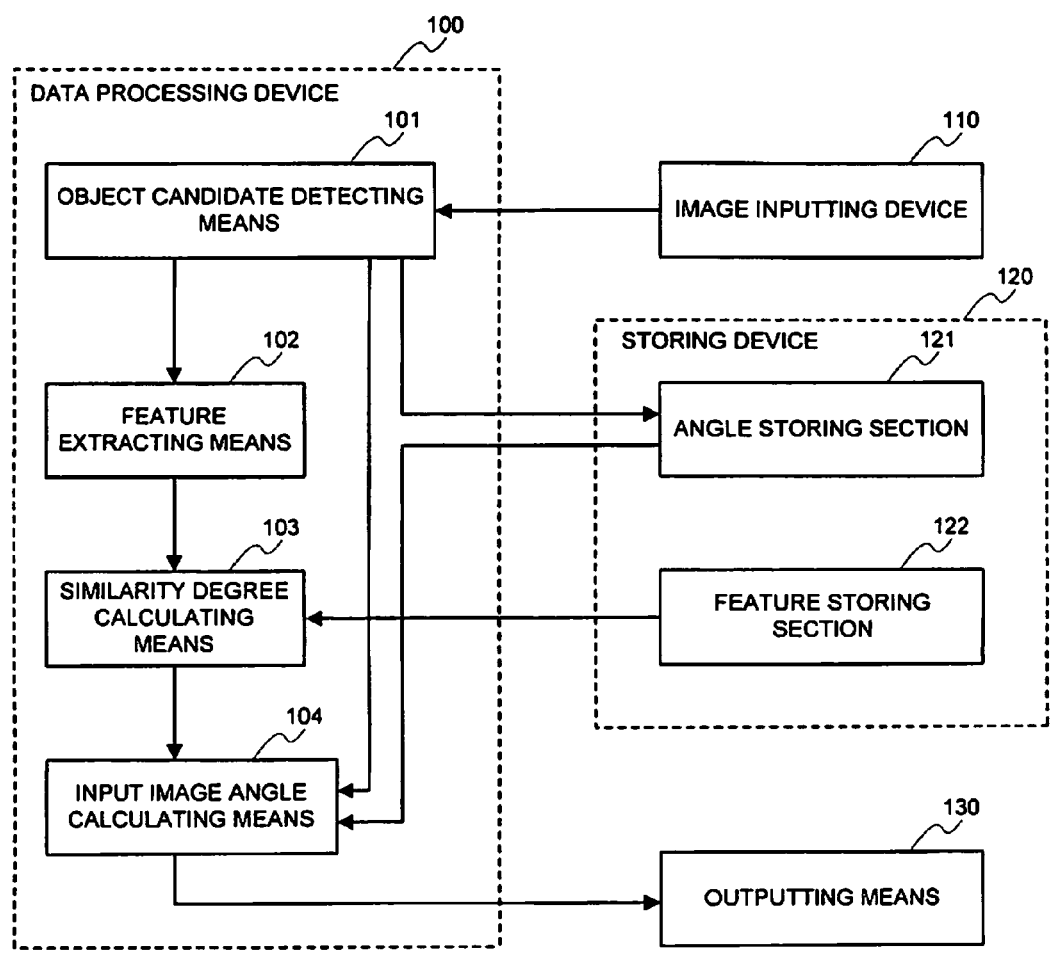
FIG. 1 is a block diagram illustrating a configuration example of the image direction determining device in accordance with a first embodiment.

Hereinafter, an embodiment of the present invention will be explained by making a reference to the accompanied drawings. FIG. 1 is a block diagram illustrating a configuration example of the image direction determining device in accordance with this embodiment. The image direction determining device shown in FIG. 1 includes a data processing device 100 that operates according to a program, an image inputting device 110 for inputting an image signal, a storing device 120 for storing information that is employed for determining the up-and-down direction of the input image, and an outputting means 130 for outputting a determination result of the up-and-down direction of the input image. Further, the data processing device 100 includes an object candidate detecting means 101, a feature extracting means 102, a similarity degree calculating means 103, and an input image angle calculating means 104. Further, the storing device 120 includes an angle storing section 121, and a feature storing section 122.

The image inputting device 110 inputs the image signal of the image, being a determination target. Further, the image inputting device 110 outputs the inputted image signal to the object candidate detecting means 101.

The object candidate detecting means 101 detects the object candidate, being a candidate for an object that is employed for the up-and-down determination, and its angle from the image by employing the image signal being inputted from the image inputting device 110. Herein, the so-called object, which can become a target of photographing, is a thing having a fixed shape or arrangement of which a constant angle (slant angle with respect to the up-and-down direction) can be detected from its shape or arrangement. With the object, anything (a person, a animal and a plant, a structure, a natural matter, etc. or a combination thereof) is acceptable, and further, its part is also acceptable so long as a constant angle is detectable from its shape or arrangement. Further, the object candidate detecting means 101, when the object candidate has been detected from the image, outputs information (for example, an image region and an angle) associated with the detected object candidate to the feature extracting means 102. Further, it stores the angle in the input image of each object candidate in the angle storing section 121. Additionally, the object candidate detecting means 101, when the object candidate has not been detected from the image, outputs an effect that "No object exists" to the input image angle calculating means 104.

Figure 2:
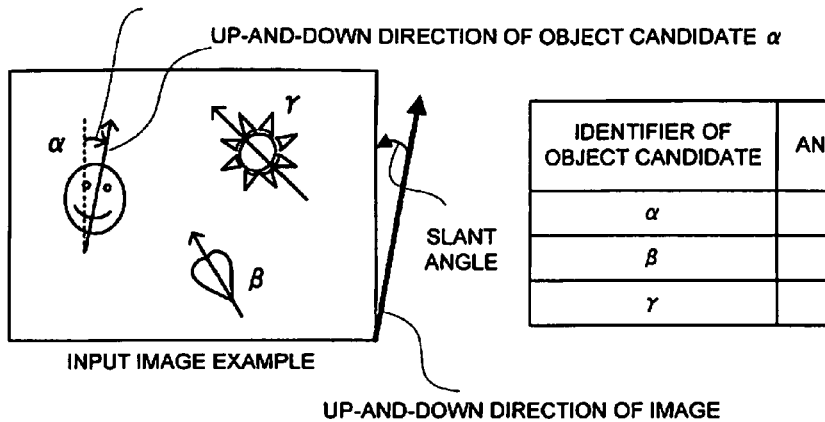
FIG. 2 is an explanatory view illustrating an example of the input image and an example of a data structure stored in an angle storing section 121.

The angle storing section 121 stores the angle in the input image of each object candidate detected by the object candidate detecting means 101. FIG. 2 is an explanatory view illustrating an example of the input image and an example of a data structure stored in the angle storing section 121. As shown in FIG. 2, the angle storing section 121 stores, for example, an identifier (hereinafter, referred to as an object candidate identifier) for identifying each object candidate detected by the object candidate detecting means 101 and information of the angle in the input image of the object candidate correspondingly to each other. An example of FIG. 2 shows that three object candidates (α, β, and γ) have been detected from the input image, and −10 degree, 30 degree, 45 degree have been detected as an angle in respective input images.

Figure 3:
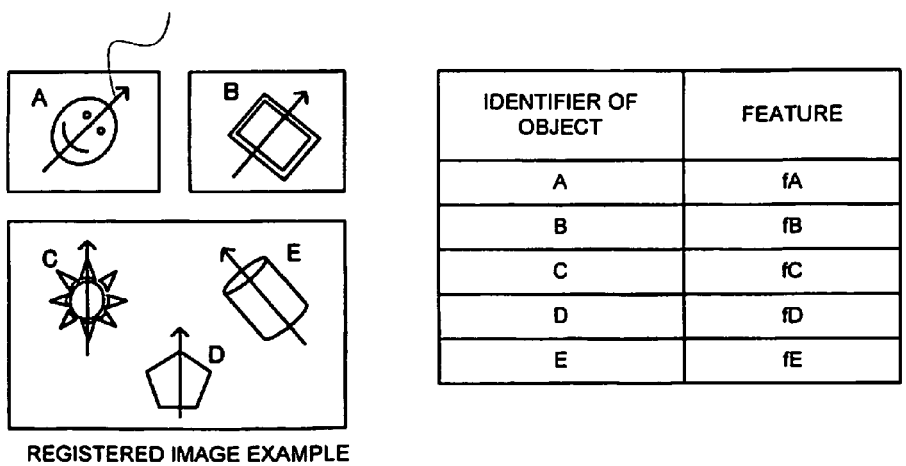
FIG. 3 is an explanatory view illustrating an example of the data structure stored in a feature storing section 122 in the first embodiment.

Further, the feature storing section 122 stores information (for example, an identifier and a feature) associated with an object (hereinafter, referred to as a registration object), which is previously photographable, and is assumed to be a comparison target of the object candidate being detected from the input image. The mode of accumulating the objects may be a mode of accumulating image information (registered images) including the objects, may be a mode of accumulating image regions of the objects including backgrounds, and may be a mode of accumulating features extracted from the image regions of the objects. Further, the kind and the number of the objects may be single in some cases and may be plural in some cases. FIG. 3 is an explanatory view illustrating an example of the registered image and an example of the data structure stored in the feature storing section 122. As shown in FIG. 3, the feature storing section 122 stores, for example, an identifier (hereinafter, referred to as a registration object identifier) for identifying a registration object and the feature of the registration object correspondingly to each other. It does not matter that the registration object is, for example, a specific person such as a person A and a person B, an animal such as a dog X and a cat Y, a plant such as a tree P and a flower Q, an architecture such as Tokyo Tower and Bay-Bridge, a natural matter such as Fuji mountain and Biwa lake, and a human artifact such as a camera and a car. Further, the registration object could be a landscape having a fixed arrangement such as the sky and the ground. Additionally, as a registration object, a thing to which a user pays attention, out of the photographable things, is more preferable.

The feature extracting means 102 extracts a feature of the object candidate from the image region of the object candidate by employing information associated with the object candidate inputted from the object candidate detecting means 101. Further, the feature extracting means 102 outputs the extracted feature to the similarity degree calculating means 103. The feature extracting means 102 may extract, for example, a value that does not change responding to the up-and-down direction, for example, a color histogram as a feature that enables the object to be identified. Further, the feature extracting means 102 may extract a value that changes responding to the up-and-down direction, for example, an edge-direction histogram. The feature extracting means 102 may extract plural kinds of the features. Additionally, when the mode of storing the registered images in the feature storing section 122 is employed as a mode of accumulating the registration objects, the feature extracting means 102 may extracts the feature of the registration object detected from the registered image to store it in the feature storing section 122.

Additionally, the feature that the feature extracting means 102 extracts is desirably a feature from which a visual difference of the feature (for example, a difference of the object, and a shift in the angle of the object) is derived at the moment of comparing the object candidate in the input image and the registration object being stored in the feature storing section 122.

The similarity degree calculating means 103 calculates the similarity degree between the feature of each object candidate being inputted from the feature extracting means 102 and that of the registration object stored in the feature storing section 122. Further, the similarity degree calculating means 103 outputs a combination of each object candidate and the registration object for which the similarity degree has been calculated, and the similarity degree in the above combination to the input image angle calculating means 104.

The similarity degree calculating means 103 calculates the similarity degree by obtaining a difference between the feature of each object candidate and that of the registration object. Additionally, the similarity degree calculating means 103 may calculate the similarity degree for each of all combinations of the object candidates and the registration objects, and may calculate the similarity degree for each of selective combinations. Additionally, when a plurality of the features are extracted by the feature extracting means 102, the these features may be integrated to obtain the difference, and the way in which the application of the features is diversified in such a manner that some feature is employed for a selective combination and some feature is employed for a difference calculation may be employed.

A relation between the property and the similarity degree of the feature will be explained by exemplifying the case of employing the input image shown in FIG. 2 and the registered image shown in FIG. 3. For example, the high similarity degree is calculated when both of the image region and the angle of the object candidate have been detected correctly in the case of employing the feature that changes responding to the up-and-down direction. Herein, the object candidate a in the input image shown in FIG. 2 is an object identical to an object A in the registered image shown in FIG. 3. Further, it is assumed that the angle in the input image of the object candidate a has been correctly detected. In this case, the high value is calculated for the similarity degree between the object candidate α and the registration object A because the feature is extracted based upon the up-and-down direction that is correct. Further, in the registered image, there exists no object identical to the object candidate β in the input image. In this case, the low value is calculated for the similarity degree as well of the object candidate β to any registration object. Further, the object candidate γ in the input image is an object identical to an object C in the registered image. However, it is assumed that the angle in the input image of the object candidate γ has been erroneously detected. In this case, the low value is calculated for the similarity degree between the object candidate γ and the registration object C because the feature is extracted based upon the up-and-down direction that is erroneous. Additionally, the low value is calculated for the similarity degree in the other combination because the objects differ from each other.

Further, for example, the high similarity degree is calculated when the image region of the object candidate has been detected correctly in the case of employing the feature that does not change responding to the up-and-down direction. This case, as compared with the case of the above-mentioned example, differs in a point that the high value is calculated for the similarity degree between the object candidate γ and the registration object C. Thus, a high-precision determination of the up-and-down direction can be performed when the angle of the object candidate in the image can be detected correctly in the case of employing the feature that does not change responding to the up-and-down direction. On the other hand, in the case of employing the feature that changes responding to the up-and-down direction, a high-precision determination of the up-and-down direction can be performed as compared with the case of employing the feature that does not change responding to the up-and-down direction when a possibility that the angle cannot be correctly detected exists, depending upon the object, because only the object candidates of which the angle has been correctly detected can be brought into focus.

Additionally, without the number of the features being utilized limited to one, the similarity degree may be calculated by narrowing a range of the objects as a comparison target by employing the feature, which does not change responding to the up-and-down direction, and further employing the feature, which changes responding to the up-and-down direction, for the objects of which a range has been narrowed as a comparison target. Doing so makes it possible to prevent the angle of the object candidate having a low reliability from being employed for the up-and-down determination of the input image, and to realize the up-and-down determination having a high precision.

The input image angle calculating means 104 calculates a slant angle with respect to the up-and-down direction of the input image. Further, the input image angle calculating means 104 outputs the calculated slant angle to the outputting means 130. The input image angle calculating means 104 calculates the slant angle with respect to the up-and-down direction of the input image based upon each similarity degree calculated by the similarity degree calculating means 103 for the combination of each object candidate and the registration object and the angle of each object candidate detected by the object candidate detecting means 101. Additionally, the input image angle calculating means 104, when an effect that "no object exists" has been inputted from the object candidate detecting means 101, assumes the slant angle to be 0 degree.

The input image angle calculating means 104 may calculate the slant angle with respect to the up-and-down direction of the input image, for example, based upon the weighted angle obtained by carrying out weighting for the angle in the input image of each object candidate based upon the similarity degree. The input image angle calculating means 104 may give weight 1 to the angle of the object candidate of which the similarity degree is highest, and weight 0 to the angle of the object candidate other than this. Upon exemplifying the case of employing the input image shown in FIG. 2 and the registered image shown in FIG. 3, the input image angle calculating means 104 calculates the slant angle of the entirety of an image-picked-up object in the input image as −10 degree by giving the weight 1 to the angle (−10 degree) in the input image of the object candidate a because the similarity degree between the object candidate a and the registration object A becomes highest. And, the input image angle calculating means 104 assumes the value (10 degree) obtained by inversing a code of the slant angle of the entirety of the imagepicked-up object to be a slant angle with respect to the up-and-down direction of the input image.

In this embodiment, the similarity degree becomes maximized when the registration object and the object candidate coincide with each other in the visual feature, and lowers as the visual difference becomes large. As a factor for lowering the similarity degree, a difference of the object, a shift in the angle between the registration object and the object candidate, or a difference of a status of the object (direction/illumination condition/expression) is thinkable; however it is difficult to determine which factor causes the similarity degree to lower, and a possibility that a decline in the similarity degree is due to a shift in the angle is not excluded. For this, when the similarity degree is low, the weighting is lowered on the assumption that the reliability of the angle of the object candidate is low. Further, the high similarity degree signifies that the condition has been satisfied for any factor, namely, the object has been correctly detected, no shift in the angle occurs, and yet the status of both coincide with each other, whereby the weighting is raised on the assumption that the reliability as well of the angle of the object candidate is high. In such a manner, pre-registering some of the specific objects, and employing the angle weighted based upon the similarity degree make it possible to resultantly utilize the angle of the face, of which the expression, the direction, and the illumination condition are identical to that of the registered image, for the up-and-down determination, and the angle of the object candidate of a class, which enables a high detection precision to be obtained, for the up-and-down determination.

The outputting means 130 outputs the slant angle with respect to the up-and-down direction of the input image calculated by the input image angle calculating means 104. In the above-mentioned example, the outputting means 130 outputs 10 degree as a slant angle with respect to the up-and-down direction of the input image. From an output result, the user can recognize that rotating the input image by 10 degree enables the up-and-down direction to be image-corrected.

Figure 4:
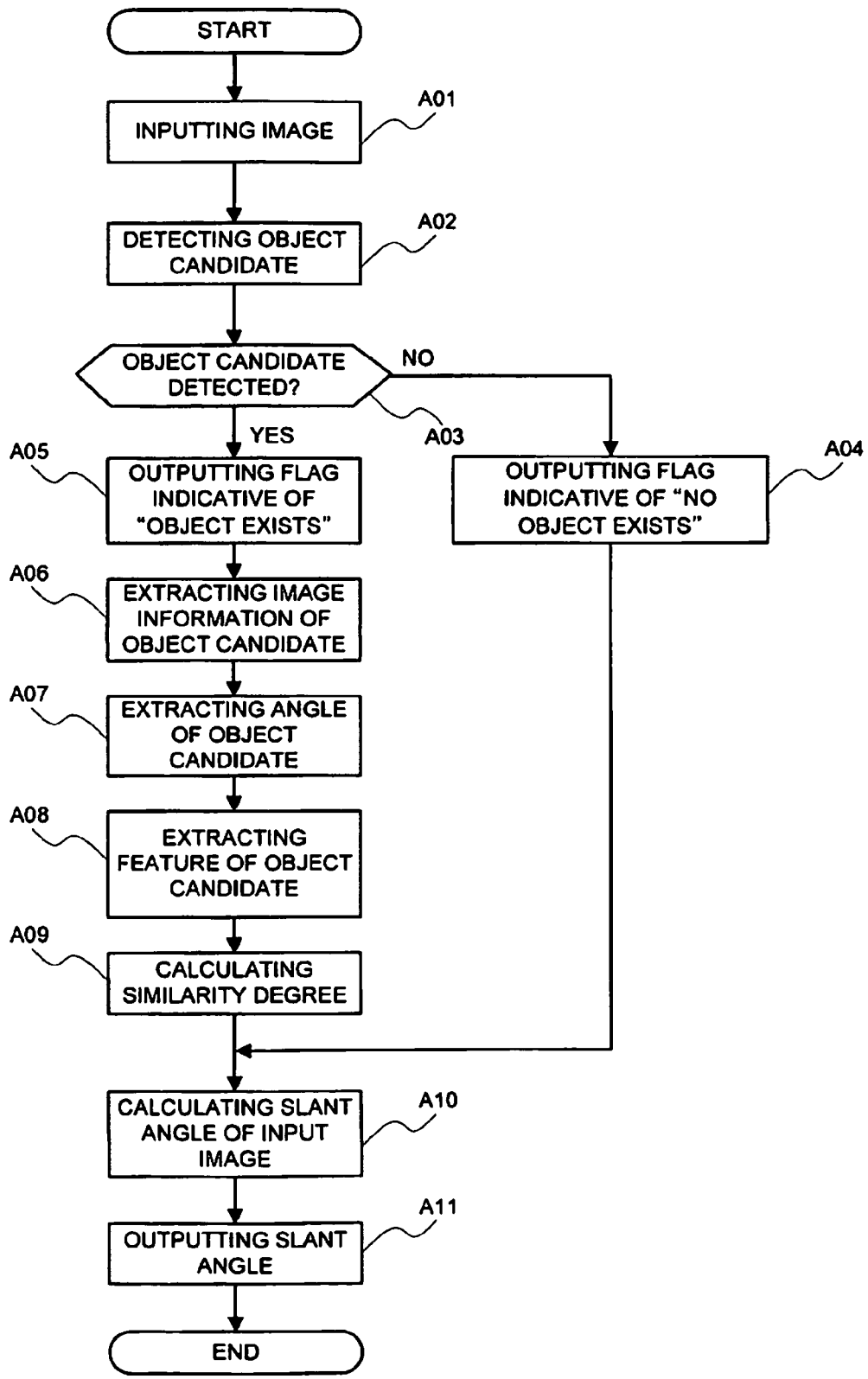
FIG. 4 is a flowchart illustrating one example of an operation of the image direction determining device in accordance with the first embodiment.

Next, an operation of this embodiment will be explained by making a reference to a flowchart of FIG. 4. FIG. 4 is a flowchart illustrating one example of an operation of the image direction determining device in accordance with the first embodiment. As shown in FIG. 4, at first, the image inputting device 110 inputs the image signal into the object candidate detecting means 101 (step A01). The object candidate detecting means 101 detects the object candidate from the input image (step A02). The object candidate detecting means 101 pre-stores information or a template indicative of features (a shape, a positional relation of configuration elements, chiaroscuro, etc.) of the object that should be detected as an object candidate, and detects the object candidate based upon a degree of coincidence with the image information (edge information and brightness information) of the input image.

Herein, when the object candidate has not been detected (No of step A03), the object candidate detecting means 101 outputs, for example, a flag signal indicative of "No object exists" to the input image angle calculating means 104 (step A04). When the object candidate has been detected (Yes of step A03), the object candidate detecting means 101 outputs, for example, a flag signal indicative of "An object exists" to the input image angle calculating means 104 (step A05). Additionally, the object candidate detecting means 101 may set a flag indicative of "An object exists/no object exists" instead of outputting a flag signal indicative of "An object exists/no object exists".

Further, the object candidate detecting means 101, when the object candidate has been detected, extracts the image information of the object candidate (step A06). The object candidate detecting means 101 may extract, for example, information indicative of the image region cut out along a contour of the object candidate as image information. Additionally, the image information, from which the feature of the object candidate can be extracted, could be information indicative of the image region including the background, and further could be information of an array etc. in which only information being employed for extracting the feature, out of information of pixels that are not extracted as an image region but are included in the above image region, has been stored.

Further, the object candidate detecting means 101 extracts the angle in the input image of the object candidate (step A07). The input image angle calculating means 104, when detecting the object candidate based upon a shape, a positional relation of the configuration elements, or the like, may obtain the object candidate, for example, based upon an angle formed by a line connecting reference points (for example, a left and a right eyes) decided by the detected shape or configuration elements and a framework line of the input image. Further, the input image angle calculating means 104, for example, when detecting the object candidate by employing the template, may assume the rotation angle of the template at the time of the detection to be an angle of the object candidate. And, the input image angle calculating means 104 outputs image information of each detected object candidate and the angle in the input image thereof to the feature extracting means 102, and allocates an object candidate identifier to the detected object candidate, and stores the object candidate identifier and the extracted angle correspondingly to each other in the angle storing section 121. Additionally, the input image angle calculating means 104 may stores information indicative of the image region of the object candidate together therewith in the angle storing section 121. Further, the feature extracting means 102 may store them in the angle storing section 121 based upon the information being inputted from the object candidate detecting means 101.

The feature extracting means 102 extracts the feature of the object candidate based upon the image information and the up-and-down direction (the angle in the input image) of the object candidate (step A08). The feature extracting means 102 extracts, for example, the feature (for example, a shape feature, and a positional relation of the configuration elements) that changes responding to the up-and-down direction, the feature (for example, a color feature) that does not change responding to the up-and-down direction, or a plurality of the features including both according to a pre-decided method. Further, the feature extracting means 102 inputs the extracted feature into the similarity degree calculating means 103.

Next, the similarity degree calculating means 103 calculates the similarity degree between the object candidate detected from the input image by the object candidate detecting means 101 and the registration object stored in the feature storing section 122 (step A09). The similarity degree calculating means 103 calculates the similarity degree of each detected object candidate in a combination with the registration object stored in the feature storing section 122 by obtaining a difference between the feature of the object candidate extracted by the feature extracting means 102 and that of the registration object stored in the feature storing section 122.

Further, the input image angle calculating means 104, when having received a flag signal indicative of "An object exists" from the object candidate detecting means 101, calculates the slant angle with respect to the up-and-down direction of the input image based upon the angle in the input image of each object candidate stored in the angle storing section 121, and the similarity degree between each object candidate calculated by the similarity degree calculating means 103 and each registration object (step A10). The input image angle calculating means 104 calculates the slant angle with respect to the up-and-down direction of the input image, for example, by employing the technique of utilizing the angle of the object candidate of which the calculated similarity degree is highest, the technique of utilizing the angle of the object candidate of which the calculated similarity degree is highest and yet is equal to or more than a threshold, the technique of utilizing an average of the angles of the object candidates of which the calculated similarity degree is equal to or more than a threshold, the technique of utilizing a most frequent value, out of the angles of the object candidates of which the calculated similarity degree is equal to or more than a threshold, the technique of utilizing the weighted angle obtained by giving a weight to each object candidate based upon the position, the size, the similarity degree, or the like.

Additionally, the input image angle calculating means 104, when having received a flag signal indicative of "No object exists" from the object candidate detecting means 101, calculates 0 degree as a slant angle with respect to the up-and-down direction of the input image.

And, the outputting means 130 outputs the slant angle with respect to the up-and-down direction of the input image calculated by the input image angle calculating means 104 (step A11).

As mentioned above, this embodiment makes it a possible to determine the up-and-down direction without necessitating the slant information of the device at the time of acquiring the image. Further, the conventional technique is not capable of performing an accurate up-and-down determination of the image when the object has been detected erroneously because the up-and-down direction of the image is determined based upon the direction of the object detected from the image. On the other hand, this embodiment makes it possible to perform a high-precision determination because the up-and-down direction of the image is determined by utilizing the up-and-down direction of the object candidate having a high reliability selected based upon the similarity degree to the pre-stored registration from among the object candidates detected from the image.

Embodiment 2

Figure 5:
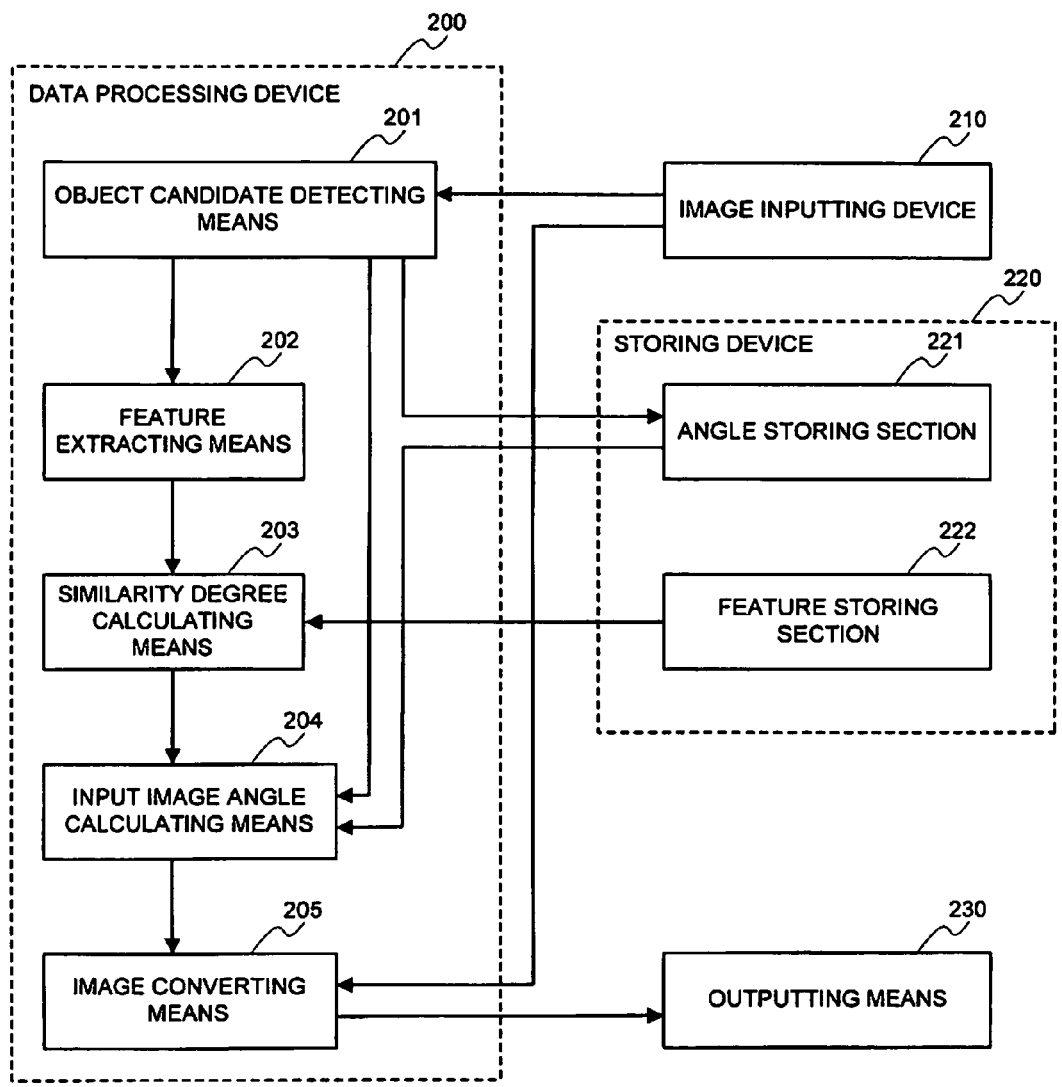
FIG. 5 is a block diagram illustrating a configuration example of the image direction determining device in accordance with a second embodiment.

Next, a second embodiment in accordance with the present invention will be explained by making a reference to the accompanied drawings. FIG. 5 is a block diagram illustrating a configuration example of the image direction determining device in accordance with the second embodiment. The image direction determining device in accordance with this embodiment differs in a point that a data processing device 200 further includes an image converting means 205 as compared with that of the first embodiment shown in FIG. 1. Additionally, other means such as an object candidate detecting means 201 is similar to the other means such as the object candidate detecting means 101 in the first embodiment.

The image converting means 205 generates a converted image obtained by converting the image signal being inputted from an image inputting device 210 based upon the slant angle with respect to the up-and-down direction of the input image calculated by an input image angle calculating means 204. As a converted image being generated by the image converting means 205, any image is acceptable so long as it is an image converted based upon the slant angle with respect to the up-and-down direction of the input image, for example, an image obtained by superposing an arrow indicative of the up-and-down direction of the image upon the input image, an image obtained by rotating the input image based upon the slant angle with respect to the up-and-down direction, and an image obtained by rotating the object region so that the up-and-down direction of each of all objects being included in the input image coincides with that of the image.

Figure 6:
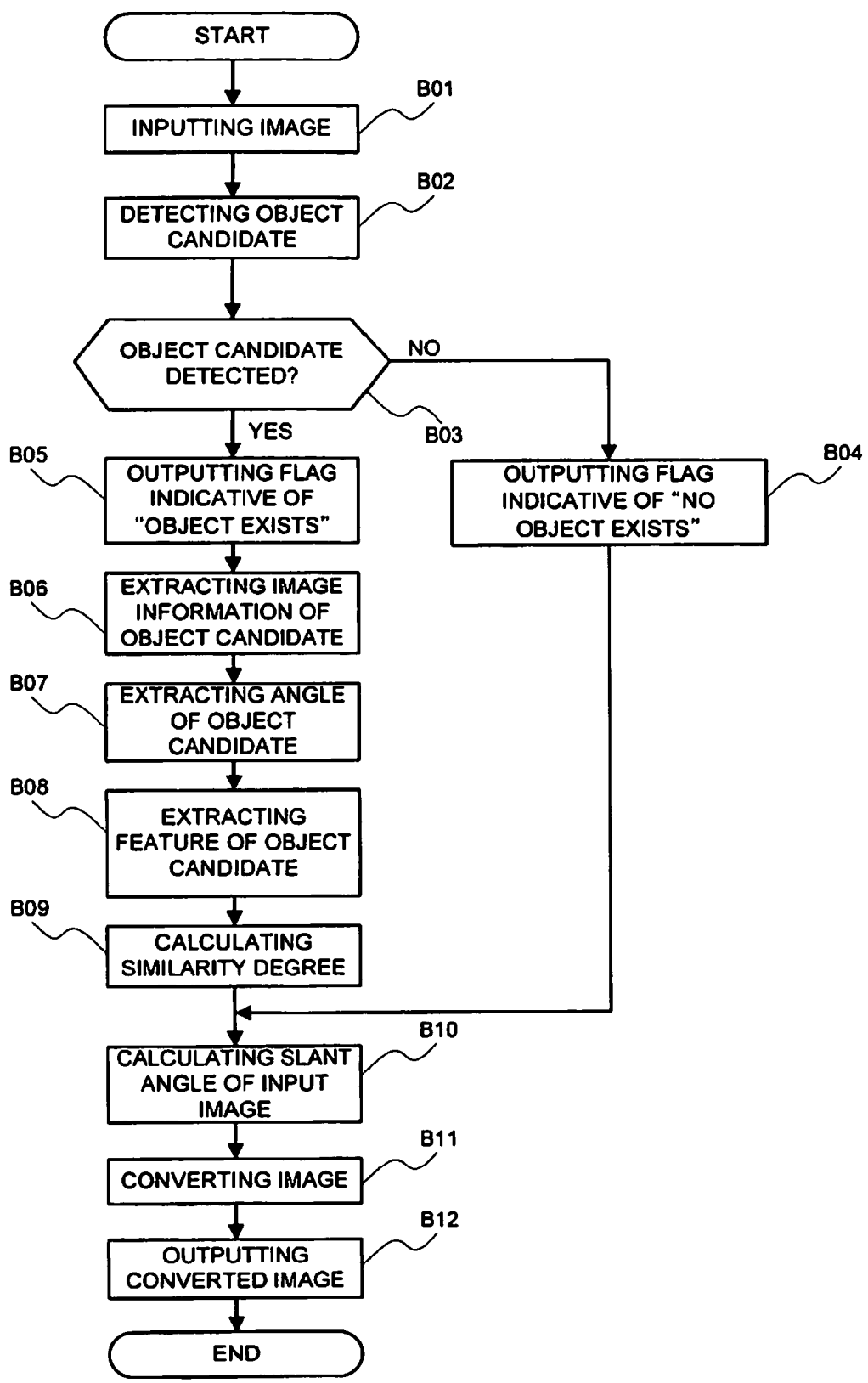
FIG. 6 is a flowchart illustrating one example of an operation of the image direction determining device in accordance with the second embodiment.

Next, an operation of this embodiment will be explained by making a reference to a flowchart of FIG. 6. FIG. 6 is a flowchart illustrating one example of an operation of the image direction determining device in accordance with the second embodiment. Additionally, operations (steps B01 to B10) of the object candidate detecting means 201, the feature extracting means 202, the similarity degree calculating means 203 and the input image angle calculating means 204 in this embodiment are similar to that (steps A01 to A10) of the object candidate detecting means 101, the feature extracting means 102, the similarity degree calculating means 103 and the input image angle calculating means 104 in the first embodiment shown in FIG. 4, respectively, and so its explanation is omitted.

As shown in FIG. 6, in this embodiment, the input image is converted by employing the slant angle with respect to the up-and-down direction of the input image calculated by the input image angle calculating means 204, and is outputted. The image converting means 205 converts the input image based upon the slant angle with respect to the up-and-down direction of the input image calculated by the input image angle calculating means 204 (step B11). And, the outputting means 230 outputs the converted image generated by the input image angle calculating means 204 (step B12).

As mentioned above, in accordance with this embodiment, the image obtained by converting the input image by utilizing the calculated slant angle with respect to the up-and-down direction of the input image is outputted. Owing to this, the user does not need to manually correct the up-and-down direction of the input image. Further, presenting the slant angle with respect to the up-and-down direction by use of not the numerical value but the converted image enables the user to instantly grasp the up-and-down direction of the input image.

Embodiment 3

Figure 7:
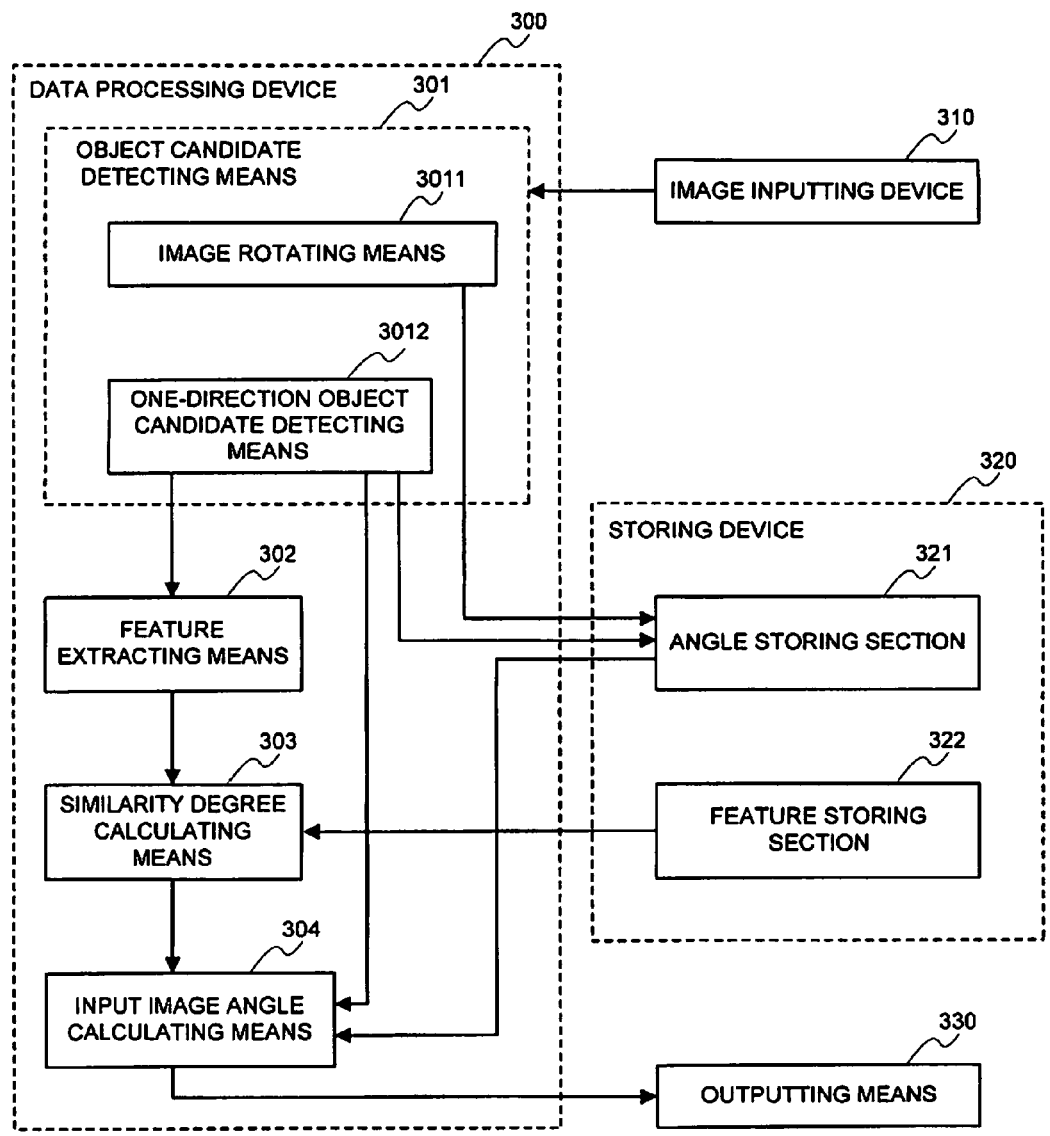
FIG. 7 is a block diagram illustrating a configuration example of the image direction determining device in accordance with a third embodiment.

Next, a third embodiment in accordance with the present invention will be explained by making a reference to the accompanied drawings. FIG. 7 is a block diagram illustrating a configuration example of the image direction determining device in accordance with the third embodiment. The image direction determining device in accordance with this embodiment differs in a point that an object candidate detecting means 301 is configured of an image rotating means 3011, and a one-direction object candidate detecting means 3012 as compared with that of the first embodiment shown in FIG. 1. Additionally, other means such as a feature extracting means 302 is similar to other means such as the object candidate detecting means 101 in the first embodiment.

The image rotating means 3011 generates a rotated image group by rotating the input image received from the image inputting device 310 at various angles with a counterclockwise direction assumed to be a positive direction. Further, the image rotating means 3011 outputs image information of the generated rotated image group to the one-direction object candidate detecting means 3012.

The one-direction object candidate detecting means 3012 employs the image information of each rotated image being inputted from the image rotating means 3011, thereby to detect the object candidate of which the angle in each rotated image is 0 degree. The one-direction object candidate detecting means 3012, when the object candidate has been detected from the rotated image, calculates the angle in the input image of the object candidate based upon the rotation angle of the rotated image, and outputs information (image information and an angle) associated with the detected object candidate to the feature extracting means 302. Further, the one-direction object candidate detecting means 3012 stores the detected angle of the object candidate together with the image identifier for identifying each rotated image and the rotation angle in the angle storing section 321. Additionally, the one-direction object candidate detecting means 3012, when no object candidate has been detected at all from all rotated images, outputs the effect that "No object exists" to the input image angle calculating means 304.

The angle storing section 321 stores the angle in the input image of each object candidate detected by the one-direction object candidate detecting means 3012. FIG. 8 is an explanatory view illustrating an example of the input images and the rotated image groups and an example of the data structure stored in the angle storing section 321. As shown in FIG. 8, the angle storing section 321 may store an identifier (hereinafter, referred to as a rotated image identifier) for identifying a rotated image generated by the image rotating means 3011, a rotation angle of the rotated image, an object candidate identifier for identifying an object candidate detected from the rotated image, and the angle in the input image of the object candidate correspondingly to each other. An example of FIG. 8 shows that object candidates α and σ have been detected from a rotated image Q1 obtained by rotating the input image by 10 degree, an object candidates β has been detected from a rotated image Q2 obtained by rotating the input image by −30 degree, and further, an object candidates γ has been detected from a rotation image Q3 obtained by rotating the input image by −7 degree as an object candidate of which the angle in the rotated image is 0 degree, respectively. Further, an example of FIG. 8 shows that −10 degree, −10 degree, 30 degree, and 7 degree have been detected as an angle in the input image of four detected object candidates (α, β, γ, and σ) responding to the rotation angles of the rotated images, respectively.

Figure 9:
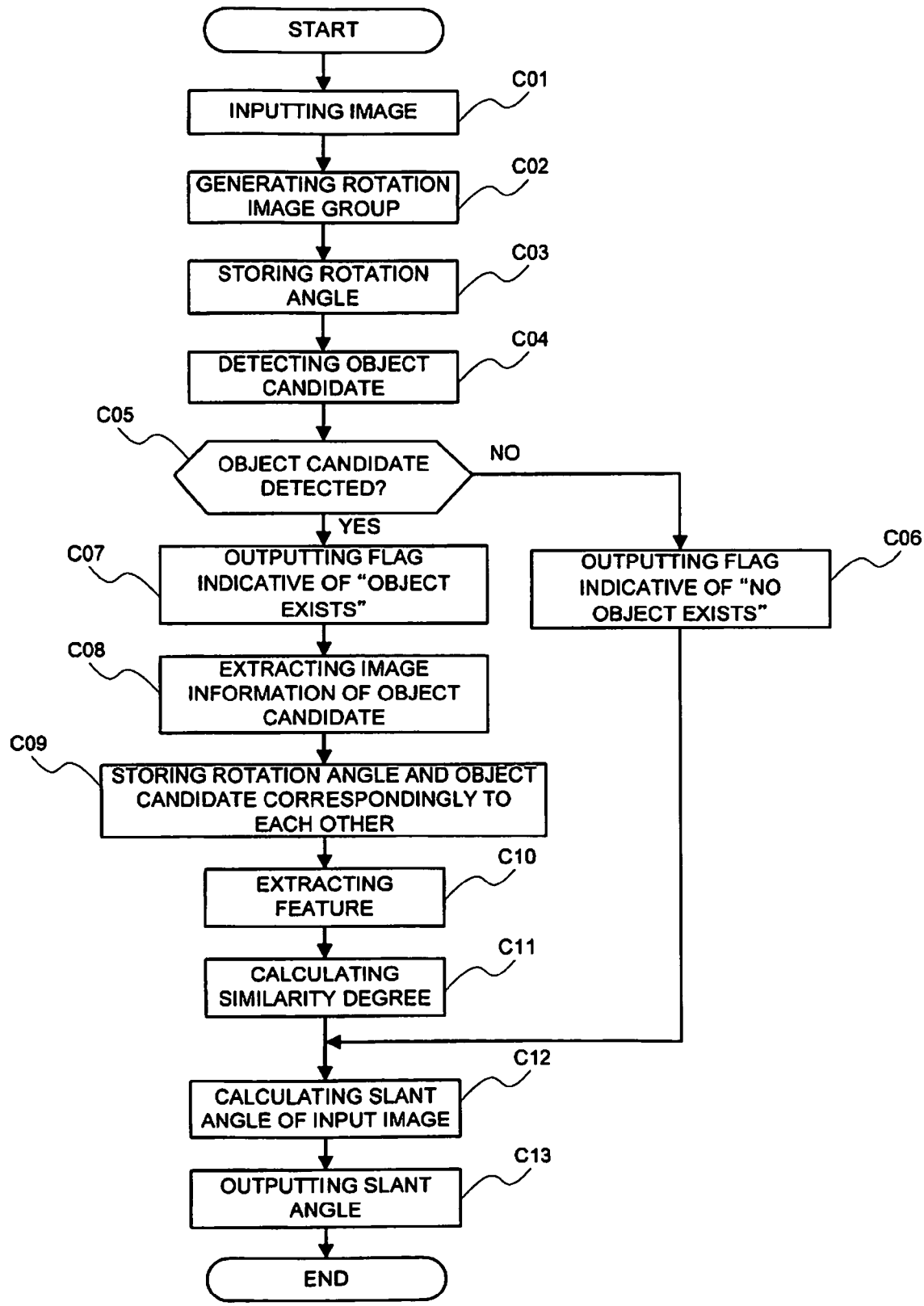
FIG. 9 is a flowchart illustrating one example of an operation of the image direction determining device in accordance with the third embodiment.

Next, an operation of this embodiment will be explained by making a reference to a flowchart of FIG. 9. FIG. 9 is a flowchart illustrating one example of an operation of the image direction determining device in accordance with the third embodiment. As shown in FIG. 9, at first, the image inputting device 310 inputs the image signal into the image rotating means 3011 (step C01). The image rotating means 3011 generates a rotated image group by rotating the input image at various angles with a counterclockwise direction assumed to be a positive direction (step C02). Further, the image rotating means 3011 stores the rotated image identifier and the rotation angle for each rotated image in the angle storing section 321 (step C02).

Next, the one-direction object candidate detecting means 3012 detects the object candidate of which the angle in the rotated image is 0 degree from each rotation image (step C04). Herein, the one-direction object candidate detecting means 3012, when the object candidate has not been detected from the rotation image group (No of step C05), outputs, for example, a flag signal indicative of "No object exists" to the input image angle calculating means 304 (step C06). The one-direction object candidate detecting means 3012, when the object candidate has been detected from the rotation image group (Yes of step C05), outputs, for example, a flag signal indicative of "An object exists" to the input image angle calculating means 304 (step C07). And, the one-direction object candidate detecting means 3012 extracts image information of the detected object candidate (step C08), and outputs the identifier of the object candidate, the image information, and the angle in the input image being calculated from the rotation angle of the rotation image to the feature extracting means 302. Further, the one-direction object candidate detecting means 3012, correspondingly to the identifier of a rotation image, stores the identifier of each object candidate detected from the rotation image, and the angle in the input image of the object candidate in the angle storing section 321 (step C09).

The feature extracting means 302 determines the up-and-down direction of the object candidate based upon the image information of the object candidate and the angle in the input image, and extracts a feature of the object candidate (step C10). Further, the feature extracting means 302 inputs the extracted feature into the similarity degree calculating means 303. The similarity degree calculating means 303 calculates the similarity degree between the feature of each object candidate extracted from the input image by the feature extracting means 302 and that of each registration object stored in the feature storing section 322 (step C11).

The input image angle calculating means 304, when having received a flag signal indicative of "An object exists" from the one-direction object candidate detecting means 3012, calculates the slant angle with respect to the up-and-down direction of the input image based upon the angle in the input image of each object candidate and the similarity degree in a combination of each object candidate and each registration object (step C12). Further, the input image angle calculating means 304, when having received a flag signal indicative of "No object exists", calculates 0 degree as an slant angle with respect to the up-and-down direction of the input image. And, the outputting means 330 outputs the slant angle with respect to the up-and-down direction of the input image calculated by the input image angle calculating means 304 (step C13).

As mentioned above, in accordance with this embodiment, also when the object candidate detecting means can detect only the object candidate having a constant angle, for example, due to a restriction upon the detection caused by the angle of the template that is pre-registered, it can detect the object candidates having various angles because of detecting the object candidate by employing the rotation image generated by the image rotating means. In other word, the object candidates having various angles can be detected responding to the rotation angle of the rotation image even though the information responding to the angle is not registered as information for detecting the object candidate.

Embodiment 4

Figure 10:
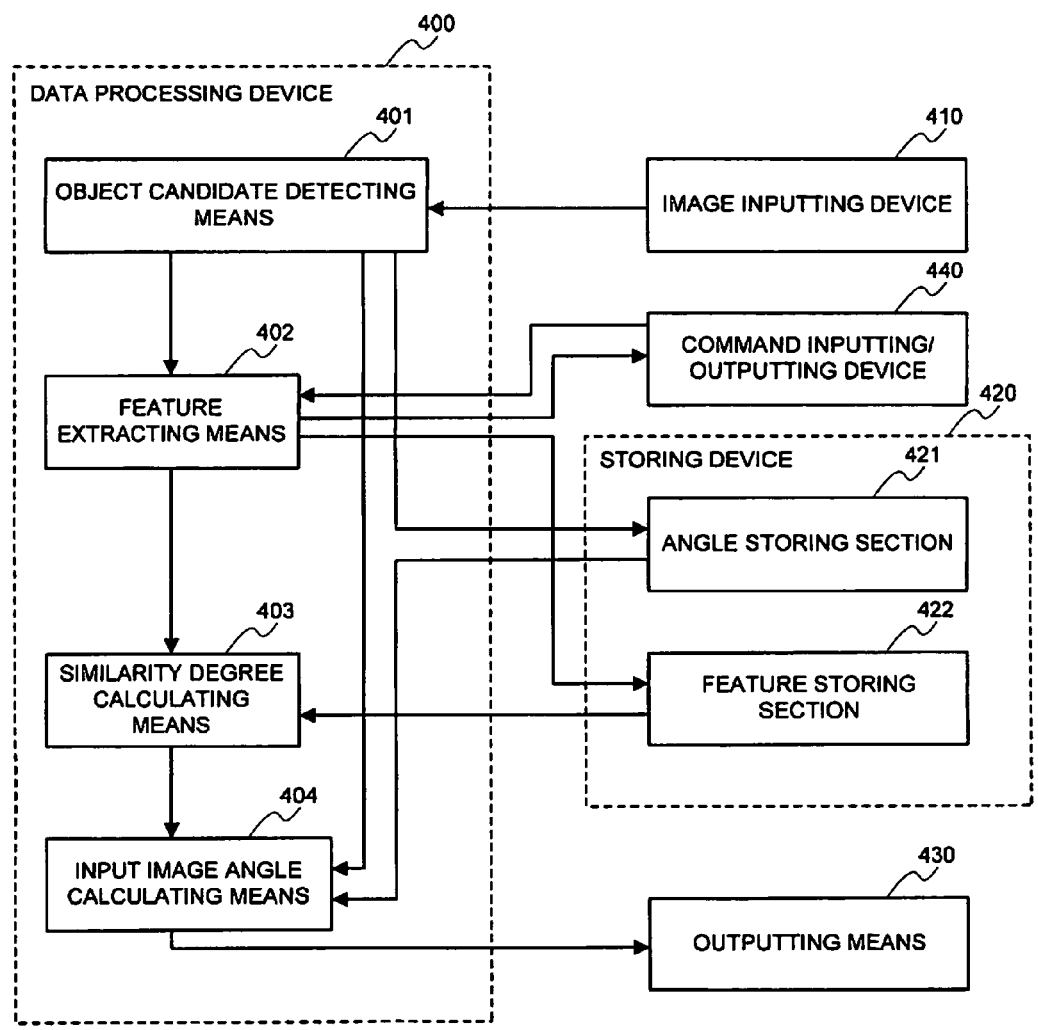
FIG. 10 is a block diagram illustrating a configuration example of the image direction determining device in accordance with a fourth embodiment.

Next, a fourth embodiment in accordance with the present invention will be explained by making a reference to the accompanied drawings. FIG. 10 is a block diagram illustrating a configuration example of the image direction determining device in accordance with the fourth embodiment. The image direction determining device in accordance with this embodiment differs in a point of further including a command inputting/outputting device 440 as compared with that of the first embodiment shown in FIG. 1. Additionally, other means such as an object candidate detecting means 401 is similar to other means such as the object candidate detecting means 101 in the first embodiment.

The command inputting/outputting device 440, responding to a user's operation, inputs a signal indicating that the image being inputted from an image inputting device 410 is a registered image. When the signal indicative of "A registered image" has been inputted from the command inputting/outputting device 440, a feature extracting means 402 assumes the object detected from the input image to be a registration object, and extracts a feature of the registration object. Further, the feature extracting means 402 stores the extracted feature as a feature of the registration object together with the registration object identification information for identifying the registration object and the image information of the registration object in a feature storing section 422. Further, the feature extracting means 402 may present the object region from which the feature is extracted and its angle to the user via the command inputting/outputting device 440, and further may receive a modification signal that is added by the user. The feature extracting means 402, when having received the modification signal, stores the feature extracted based upon the modified object region and the angle in the feature storing section 422. Additionally, the feature extracting means 402, when the signal indicative of "A registered image" is not inputted from the command inputting/outputting device 440, treats the extracted feature as a feature of the object candidate similarly to the case of the first embodiment.

Figure 11:
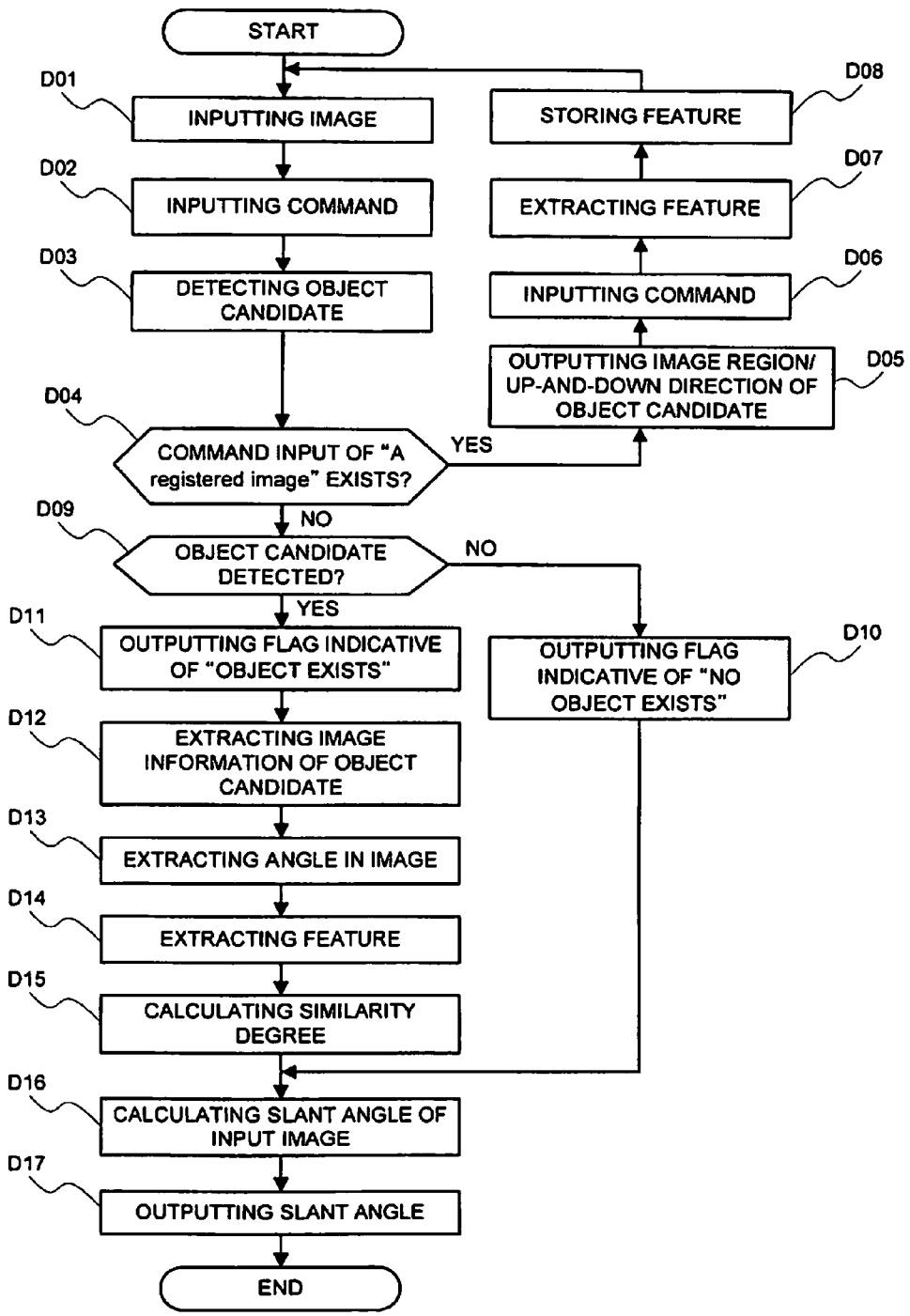
FIG. 11 is a flowchart illustrating one example of an operation of the image direction determining device in accordance with the fourth embodiment.

Next, an operation of this embodiment will be explained by making a reference to a flowchart of FIG. 11. FIG. 11 is a flowchart illustrating one example of an operation of the image direction determining device in accordance with the fourth embodiment. Additionally, an operation (steps D09 to step D17) in the case that the signal indicative of "A registered image" is not inputted is similar to the operation (steps A03 to step A11) of the first embodiment shown in FIG. 4, so its explanation is omitted.

At first, the image inputting device 410 inputs the image signal into the object candidate detecting means 401 (step D01). Further, at this moment, the signal indicative of "A registered image" is inputted via the command inputting/outputting device 440 (step D02).

The object candidate detecting means 401 detects a object candidate from the input image inputted from the image inputting device 410 (step D03), extracts the image region and the angle of the detected object candidate, and outputs them to the feature extracting means 402. Next, the feature extracting means 402, when the signal indicative of "A registered image" has been inputted from the command inputting/outputting device 440 (Yes of step D04), outputs the image region and the up-and-down direction (angle in the input image) of the object candidate being inputted from the object candidate detecting means 401 to the command inputting/outputting device 440 (step D05).

The command inputting/outputting device 440 receives the image region and the angle in the input image of the object candidate outputted by the feature extracting means 402, and presents them to the user. When the user has added a modification signal as a result of judging that an error exists in the presented image region and angle of the object candidate, the command inputting/outputting device 440 outputs the modification signal to the feature extracting means 402 (step D06).

The feature extracting means 402 modifies the image region of the object candidate and its angle based upon the modification signal being inputted from the command inputting/outputting device 440, and extracts a feature of the object candidate based upon the modified image region and angle (step D07). And, the feature extracting means 402 stores the extracted feature as a feature of the registration object together with the image region of the object candidate and its angle in the feature storing section 422 (step D08). Hereinafter, it performs the similar operation whenever the image signal of the input image is inputted. Additionally, an operation in the case that, in the step D04, the signal indicative of "A registered image" has not been inputted is similar to that of the first embodiment.

As mentioned above, in accordance with this embodiment, the user can register the registration object that is employed for the up-and-down determination of the input image because the command inputting/outputting device 440 for registering the feature of the registration object has been provided.

Embodiment 5

Figure 12:
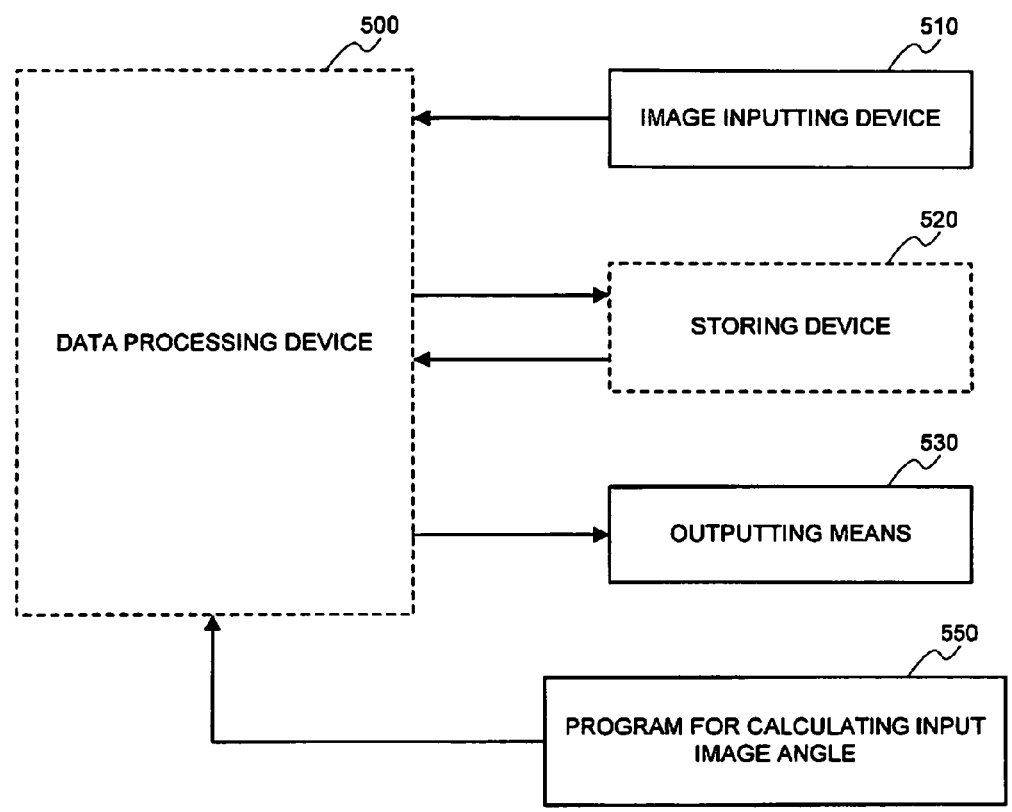
FIG. 12 is a block diagram illustrating a configuration example of the image direction determining device in accordance with a fifth embodiment.

Next, a fifth embodiment in accordance with the present invention will be explained by making a reference to the accompanied drawings. FIG. 12 is a block diagram illustrating a configuration example of the image direction determining device in accordance with the fifth embodiment. The image direction determining device in accordance with this embodiment includes a data processing device 500, an image inputting device 510, a storing device 520, an outputting means 530, and an input image angle calculating program 550.

The input image angle calculating program 550, which is loaded into the data processing device 500, is a program for controlling the data processing device 500, and performing the operations of the first, the second, and the third embodiments in accordance with the present invention. Additionally, the input image angle calculating program 550 is stored, for example, into the storing device (a memory, an external storing device, etc.) that the image direction determining device includes. The data processing device 500 operates according to the input image angle calculating program 550, thereby to execute a process identical to that of the data processing devices 100, 200, and 300 in the first, the second, and the third embodiments, respectively. Further, the data processing device 500 operates according to the program, thereby allocating the storage region as an angle storing section or a feature storing section to the storing device 520, in which an intermediate data and a registration data being generated by each means of the data processing device 500 are stored.

Embodiment 6

Figure 13:
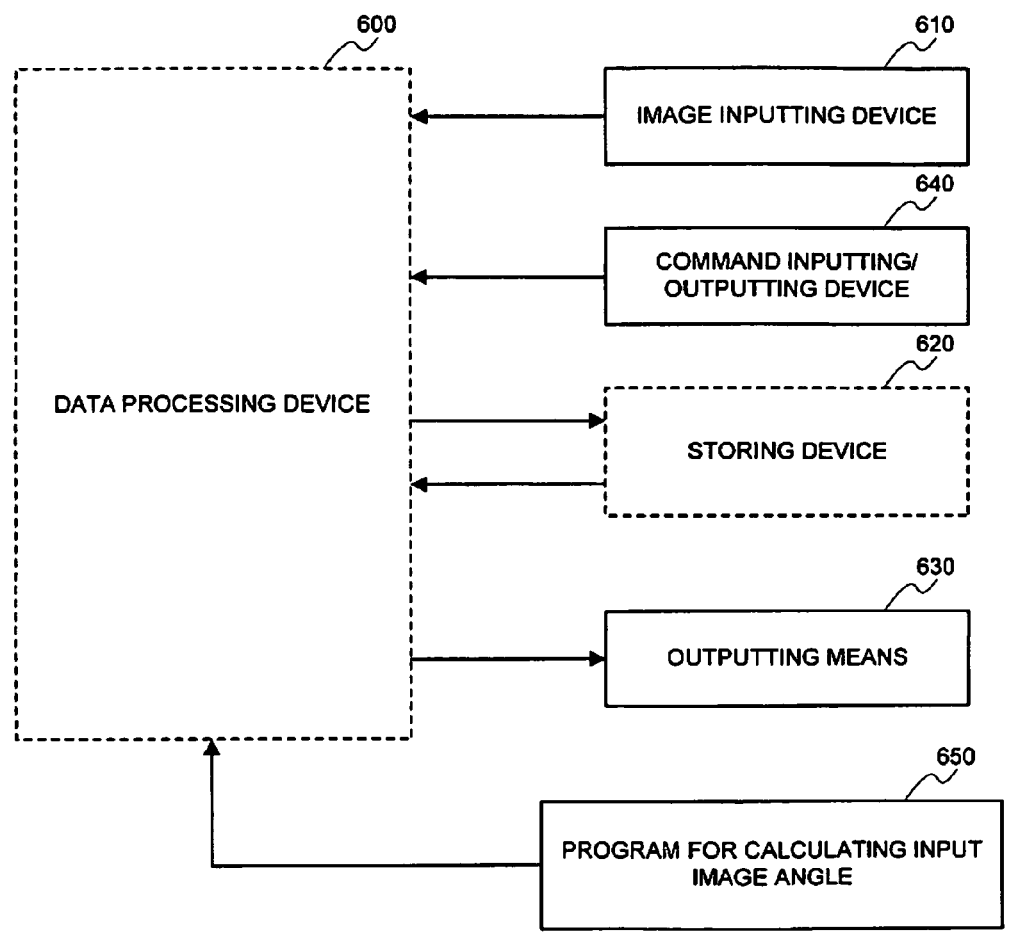
FIG. 13 is a block diagram illustrating a configuration example of the image direction determining device in accordance with a sixth embodiment.

Next, a sixth embodiment in accordance with the present invention will be explained by making a reference to the accompanied drawings. FIG. 13 is a block diagram illustrating a configuration example of the image direction determining device in accordance with the sixth embodiment. The image direction determining device in accordance with this embodiment includes a data processing device 600, an image inputting device 610, a storing device 620, an outputting means 630, a command inputting/outputting device 640, and an input image angle calculating program 650.

The input image angle calculating program 650, which is loaded into the data processing device 600, is a program for controlling the data processing device 600, and performing the operation of the fourth embodiment in accordance with the present invention. Additionally, the input image angle calculating program 650 is stored, for example, into the storing device (a memory, an external storing device, etc.) that the image direction determining device includes. The data processing device 600 operates according to the input image angle calculating program 650, thereby to execute a process identical to that of the data processing device 400 in the fourth embodiment. Further, the data processing device 600 operates according to the program, thereby allocating the storage region as an angle storing section or a feature storing section to the storing device 620, in which an intermediate data and a registration data being generated by each means of the data processing device 600 are stored.

EXAMPLE 1

Figure 14:
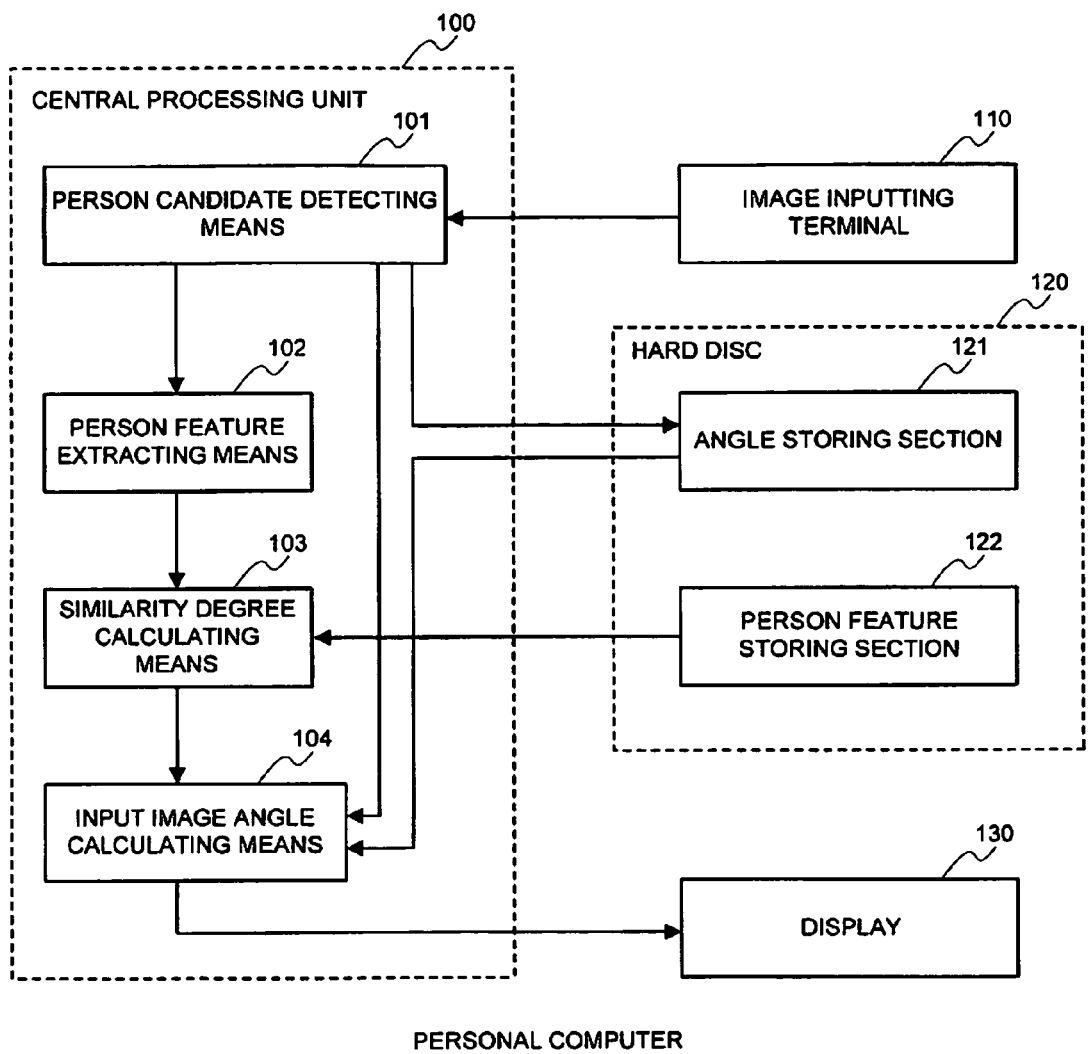
FIG. 14 is an explanatory view illustrating a configuration example of a first example.

Next, the mode for carrying out the present invention will be explained by employing a specific example. This example corresponds to the first embodiment of the present invention. FIG. 14 is an explanatory view illustrating a configuration example of the image direction determining device applied for a personal computer as a first example. As shown in FIG. 14, the personal computer in this example includes a central processing unit as a data processing device 100, an image input terminal as an image inputting device 110, a hard disc as a storing device 120, and a display as an outputting means 130. Additionally, the image direction determining device in accordance with this example pre-stores the images of specific persons such as a person A, a person B, . . . as a registered image, and determines the up-and-down direction of the input image when the image including the person has been inputted as an input image.

The central processing unit 100 operates according to the program, thereby to function as an object candidate detecting means 101, a feature extracting means 102, a similarity degree calculating means 103, and an input image angle calculating means 104. Additionally, in this example, the object candidate detecting means 101 operates as a person candidate detecting means 101 for detecting the person as an object candidate. Further, the feature extracting means 102 operates as a person feature extracting means 102 for extracting the feature of the person candidate. Further, the similarity degree calculating means 103 calculates the similarity degree between each person candidate and the registration person being included in each registered image, and the input image angle calculating means 104 calculates the slant angle with respect to the up-and-down direction of the input image based upon each similarity degree in a combination of each person candidate and the registration person, and the angle of each person candidate.

Further, the storage region that functions as the angle storing section 121 and the feature storing section 122 is allocated to the hard disc 120. Additionally, in this example, the angle storing section 121 stores the angle in the input image of a person candidate detected by the person candidate detecting means and the person candidate identifier for identifying the person candidate correspondingly to each other. Further, the feature storing section 122, which operates as a person feature storing section 122, stores the feature of a person (registration person) pre-extracted from the registered image, of which the up-and-down direction is known, and the registration person identifier for identifying the registration person correspondingly to each other.

Herein, it is assumed that the image has been inputted from the image input terminal 110. The central processing unit 100 detects the person candidate from the input image in the person candidate detecting means 101. The central processing unit 100, when the person candidate has been detected, outputs a flag signal indicative of "A person exists" to the input image angle calculating means 104, extracts the angle in the input image of each person candidate, and stores it into the angle storing section 121 within the hard disc 120. Further, it outputs the image region of each person candidate and its angle to the person feature extracting means 102.

As a method of detecting the person candidate, for example, the technique may be employed of detecting a person face described in the document 'Yoshio Iwai, Shihong Lao, Osamu Yamaguti, and Takatusgu Hirayama, "A Survey on Face Detection and Face Recognition" Technical Report by Information Processing Society, CVIM-149, 2005; pp. 343-368' (Reference document 1). The method of detecting a person face described in the Reference document 1 is a method of performing face detection by employing the template prepared by utilizing the fact that the contour of a face (head portion) is oval, and an eye or a mouth has a long-strip shape. Additionally, the technique of detecting the person face is not limited to the technique of detecting the person face described in the Reference document 1, and for example, the technique of utilizing the characteristic of a brightness distribution that the part of the cheek or the forehead is high in brightness and the part of the eye or the mouth is low in brightness, the technique of performing the face detection by utilizing symmetricality, a skin color region, and a position of the face, or the like may be employed.

Further, the technique can be listed of pre-storing the image in which the whole body of a person or a person face has been photographed as a template, and determining that the person exists in the input image when a difference obtained from the input image and the image information of the template is equal to or less than a predetermined threshold. The person image being stored as a template could be an image that the user inputs via the image input terminal 110, and could be an image selected by the person candidate detecting means 101 based upon the feature of the person that is designated by the user.

Further, the technique can be listed of utilizing a neural net, a support vector machine, an Adaboost method, etc. for statistically learning a feature distribution obtained from a large volume of person-face samples for learning and a large volume of non-face samples for learning, and determining which distribution, out of a face distribution and a non-face distribution, the feature being obtained from the input image belongs to.

Further, the angle in the input image of the person candidate can be obtained by calculating, for example, the angle that is formed by a perpendicular bisector of a straight line connecting an left eye and a right eye to a perpendicular direction of the input image in the case of employing the technique of detecting the person face based upon the template prepared based upon a contour of the face and shapes of the eye and the mouth.

Further, the rotation angle of the template employed for detection of the person face may assumed to be an angle in the input image of the person candidate in the case of employing the technique of storing the image having the person face as a template, and detecting the person face by use of a difference value between the template rotated at various angles and one part of the input image.

The technique in the above-mentioned example may be utilized, and the other techniques may be applied as a technique of detecting the person. Further, as a region of the person being extracted, any region, from which the feature of the person can be extracted by the person feature extracting means, is acceptable, for example, an image region cut out precisely along the contour of the person, and an image region including the background. Additionally, the person candidate detecting means 101, when the person candidate has not been detected from the input image, outputs a flag signal indicative of "No person exists" to the input image angle calculating means 104.

The person feature extracting means 102 extracts the feature of the person from the region extracted as an image region of the person candidate from the input image. The person feature extracting means 102 extracts, for example, the feature of the person by employing color information of wearing clothes of the person, a face feature of the person, a shape of the person, or the like. As a face feature of the person, for example, the feature vector having shapes of an eye/nose/mouth or a positional relation thereof numerically described by making the most of knowledge associated with a structure of the face, which is elaborated on in a document 'Shigeru Akamatsu, "Computer Recognition of Human Faces—A Survey—", The Transactions of the Institute of Electronics, Information and Communication Engineers, August 1997, Vol. J-80-A. No. 8, pp. 1215-1230' (Reference document 2), may be employed. Further, the feature vector for expressing a gradation value of each pixel of the face as a two-dimensional array, the feature vector called a Gabor jet, which is capable of expressing a local periodicity of a pattern and its directivity that are obtained by performing a wavelet transform at each feature point of the face, or the like can be listed in addition to the feature described in the Reference Document 2. As a feature of the person face that is employed for determining the similarity degree between the persons, the technique in the above-mentioned example may be utilized, and the other techniques may be applied.

The similarity degree calculating means 103 calculates the similarity degree between the feature of each registration person (a person A, a person B, . . . ) acquired from the registered image, which has been pre-stored in the person feature storing section 122 within the hard disc 120, and that of each person candidate detected from the input image. The similarity degree can be obtained, as one example, from a difference between the feature vector of the face of each person candidate detected from the input image and that of the face of each pre-stored registration person (a person A, a person B, . . . ).

Further, as another example of a method of calculating the similarity degree, the technique of employing a difference between pixel values can be listed. For example, a difference z between the angle in the input image of the face of the person candidate detected from the input image and the angle in the registered image of the face of the pre-stored registration person is obtained. The similarity degree is calculated by normalizing the size of the image region of the face of the person candidate to the size of the face of the pre-stored registration person, superposing the face of the person candidate detected from the input image and that of the registration person (a person A, a person B, . . . ) upon each other by performing an affin transform to rotate the image region of the face of the person candidate detected from the input image by z degree, and obtaining a total sum of a difference between the corresponding pixel values.

Further, at the moment of the superposition, the rotation angle of the image region of the pre-stored registration person may be defined as be $z\pm\Delta$ to obtain the similarity degree at each rotation, and to employ its maximum value as a similarity degree. In this case, the angle $\Delta$ for calculating the maximum value enables the angle in the registered image of the pre-stored registration person to be corrected. Additionally, the number of the registration persons being pre-stored may be one in some cases, and may be plural in some cases. The similarity degree calculating means 103 calculates the similarity degrees in various combinations of each person candidate and each registration person, and outputs them to the input image angle calculating means 104.

The input image angle calculating means 104, upon receipt of a flag signal indicative of "No person exists" from the person candidate detecting means 101, assumes the slant angle with respect to the up-and-down direction of the input image to be 0 degree. On the other hand, the input image angle calculating means 104, upon receipt of a flag signal indicative of "A person exists" from the person candidate detecting means 101, calculates the slant angle with respect to the up-and-down direction of the input image based upon each similarity degree in a combination of each person candidate being inputted from the similarity degree calculating means 103 and each registration person, and the angle in the input image of each person candidate. The input image angle calculating means 104 may calculate the slant angle, for example, by employing techniques shown next.

[1] A technique of utilizing the angle of the person candidate that most resembles the registration person The angle in the input image of a person candidate I(i) is defined as arg(i). Further, the similarity degree between the person candidate I(i) and a registration person J(j) is defined as S(I(i), J(j)). Additionally, i=1−N (N=the number of the person candidates), and j=1−M (M=the number of the registration persons). At this time, for a combination of the person candidate I(i) and the registration person J(j), a slant angle $x_1$ with respect to the up-and-down direction of the input image can be obtained by an equation (1) when weight 1 is given to the angle of a person candidate I(i1) of the similarity degree being calculated is maximum and weight 0 is given to the angles of the other person candidates.

$$x_1 = \arg(i1) \tag{1}$$

In such a manner, in the technique [1], only the angle of the person candidate of which the similarity degree to the registration person is highest is utilized for calculating the slant angle with respect to the up-and-down direction. For this, there exists an effect that a precision hardly deteriorates even if the person candidate is erroneously detected in the person candidate detecting means.

[2] A technique of utilizing the angle of the person candidate, of which the similarity degree to the registration person is equal to or more than a threshold, and which most resembles the registration person.

The angle in the input image of a person candidate I(i) is defined as arg(i). Further, the similarity degree between the person candidate I(i) and a registration person J(j) is defined as S(I(i), J(j)). Additionally, i=1−N (N=the number of the person candidates), and j=1−M (M=the number of the registration persons). At this time, for a combination of the person candidate I(i) and the registration person J(j), a slant angle $x_2$ with respect to the up-and-down direction of the input image can be obtained by an equation (2) when, in a case where the similarity degree of a person candidate I(i2) of the similarity degree being calculated is maximum, is equal to or more than a predetermined threshold, weight 1 is given to the angle of the person candidate I(i2) and in a case where it is not so, weight 0 is given hereto, and yet weight 0 is given to the angles of the other person candidates.

$$x_2 = \arg(i2) \tag{2}$$

$x_2=0$ (when the similarity degree of the person candidate I(i2) does not reach a predetermined threshold)

In such a manner, in the technique [2], only the angle of the person candidate of which the similarity degree to the registration person is highest and yet becomes equal to or more than a threshold is utilized for calculating the slant angle with respect to the up-and-down direction. For this, there exists an effect of preventing the erroneous calculation of the slant angle caused by the angle in the input image of the person candidate, which has the highest similarity degree, but has a low reliability as an object.

[3] A technique of utilizing an average of the angles of the persons of which the similarity degree is equal to or more than a threshold The angle in the input image of a person candidate I(i) is defined as arg(i). Further, the maximum value of the similarity degree between each person candidate I(i) and each registration person is defined as Smax(I(i)). Additionally, i=1–N (N=the number of the person candidates). At this time, a slant angle $x_3$ with respect to the up-and-down direction of the input image can be obtained by an equation (3) when, in a case where Smax(I(i)) is equal to or more than a predetermined threshold, weight w(i)1 is given to the angle of the person candidate I(i), and in a case where it is not so, weight w(i)=0 is given hereto.

[Numeral equation 1]

$$x_3 = \frac{1}{\sum_{i}^{N} w(i)} \sum_{i=1}^{N} -w(i) \cdot \arg(i) \tag{3}$$

$x_3=0$ (when Smax(I(i)) of all person candidates does not reach a predetermined threshold)

In such a manner, in the technique [3], the angles of a person candidate group of which the similarity degree to the registration person is high are averaged, thereby to calculate the slant angle with respect to the up-and-down direction. For this, there exists an effect of suppressing deterioration in the precision due to an error even if each of the angles of a person candidate group of which the similarity degree is high contains some error to a certain extent.

[4] A technique of utilizing a most frequent value of the angle, out of the angles of the persons of which the similarity degree is equal to or more than a threshold The maximum value of the similarity degree between each person candidate I(i) and each registration person is defined as Smax(I(i)). Further, the most frequent value of the angle in the input image of each person candidate I(i) of which Smax (I(i)) is equal to or more than a predetermined threshold is defined as arg(i4). Additionally, i=1–N (N=the number of the person candidates). At this time, a slant angle $x_4$ with respect to the up-and-down direction of the input image can be obtained by an equation (4) when weight 1 is given to arg(i4) and weight 0 is given to the angles other than it.

$$x_4 = -\arg(i4) \tag{4}$$

$x_4=0$ (when Smax(I(i)) of all person candidates does not reach a predetermined threshold)

In such a manner, in the technique [4], the most frequent value of the angle of the person candidate group of which the similarity degree to the registration person is high is utilized for calculating the slant angle with respect to the up-and-down direction. For this, there exists an effect that deterioration in the precision of the person candidate group of which the similarity degree to the registration person is high hardly occurs even if an error exists in the detection region thereof or a shift in the angle thereof.

[5] A technique of utilizing a weight that corresponds to a position of the person candidate The maximum value of the similarity degree between each person candidate I(i) and each registration person is defined as Smax(I(i)). Additionally, i=1–N (N=the number of the person candidates). Further, a distance between a gravity center of each person candidate I(i) of which Smax(I(i)) is equal to or more than a predetermined threshold and an image center of the input image is defined as d(i), and the angle of the person candidate of which d(i) becomes minimized is defined as be arg(i5). At this time, a slant angle $x_5$ with respect to the up-and-down direction of the input image can be obtained by an equation (5) when weight 1 is given to arg(i5) and weight 0 is given to the angles other than it.

$$x_5 = -\arg(i5) \tag{5}$$

$x_5=0$ (when Smax(I(i)) of all person candidates does not reach a predetermined threshold)

In such a manner, in the technique [5], the angle of the candidate near to the image center, out of the person candidates of which the similarity degree to the registration person is high, is employed, thereby to calculate the slant angle with respect to the up-and-down direction. Selecting the candidate near to the image center enables the slant angle having a high reliability to be calculated because, as a rule, at the moment of taking a picture, the picture is taken so that the person is arranged in the center of the picture.

[6] A technique of utilizing a weight that corresponds to an area of the person candidate The maximum value of the similarity degree between each person candidate I(i) and each registration person is defined as Smax(I(i)). Additionally, i=1–N (N=the number of the person candidates). Further, an area of each person candidate I(i) of which Smax(I(i)) is equal to or more than a predetermined threshold is defined as a(i), and the angle of the person candidate of which a(i) becomes maximized is defined as arg(i6). At this time, a slant angle $x_6$ with respect to the up-and-down direction of the input image can be obtained by an equation (6) when weight 1 is given to arg(i6) and weight 0 is given to the angles other than it.

$$x_6 = -\arg(i6) \tag{6}$$

$x_6=0$ (when Smax(I(i)) of all person candidates does not reach a predetermined threshold)

In such a manner, in the technique [6], the angle of the candidate occupying a large image area, out of the person candidates of which the similarity degree to the registration person is high, is employed, thereby to calculate the slant angle with respect to the up-and-down direction. Selecting the candidate occupying a large area enables the slant angle having a high reliability to be calculated because, as a rule, at the moment of taking a picture of a person, the picture is taken so that the person largely comes out in the picture.

[7] A technique of utilizing a weight that corresponds to the similarity degree

The maximum value of the similarity degree between each person candidate I(i) and each registration person is defined as Smax(I(i)). Additionally, i=1–N (N=the number of the person candidates). At this time, a slant angle $x_7$ with respect to the up-and-down direction of the input image can be obtained by an equation (7) when weight w(i)=Smax(I(i)) is given to an angle arg(i) in the input image of each person candidate I(i).

[Numeral equation 2]

$$x_7 = \frac{1}{\sum_{i}^{N} w(i)} \sum_{i=1}^{N} -w(i) \cdot \arg(i) \tag{7}$$

$$w(i) = S\max(I(i))$$

Further, in the technique [7], the slant angle $x_7$ with respect the up-and-down direction of the input image may be obtained by the equation (7) by giving weight w(i)=Smax(I(i)) to the angle of each person candidate I(i) of which Smax(I(i)) is equal to or more than a predetermined threshold, and weight w(i)=0 to the angles of the person candidates other than it. At this time, the slant angle $x_7$ with respect the up-and-down direction of the input image is assumed to be 0 when the person candidate of which Smax(I(i)) is equal to or more than a predetermined threshold does not exist.

In such a manner, in the technique [7], the weighting is carried out for each of the angles of the person candidate group, of which the similarity degree to the registration person is high, based upon the similarity degree, thereby to calculate the slant angle with respect to the up-and-down direction. For this, when each of the angles of a person candidate group of which the similarity degree is high contains an error, there exists an effect of suppressing deterioration in the precision due to the error.

[8] A technique of correcting the slant angle to a multiple value of 90 degree

The numerical value, out of −90 degree, 0 degree, 90 degree, and 180 degree, nearest to the slant angle with regard to the up-and-down direction obtained in the techniques [1] to [7], is assumed to be a slant angle with respect to the up-and-down direction of the input image.

In general, it is standard that the picture, which is taken with the digital camera etc., has a slant of a multiple value of 90 degree. For this, there is an effect that this technique enables the slant angle with respect to the up-and-down direction calculated with the various methods to be corrected to a standard numerical value.

In this example, the input image angle calculating means 104 calculates the slant angle with respect to the up-and-down direction of the input image by employing any of the above-mentioned techniques. Additionally, the techniques other than the foregoing may be employed. The input image angle calculating means 104 outputs the calculated slant angle with respect to the up-and-down direction of the input image to the display 130.

The user can grasp the up-and-down direction of the input image based upon the slant angle with respect to the up-and-down direction of the image outputted to the display.

EXAMPLE 2

Figure 15:
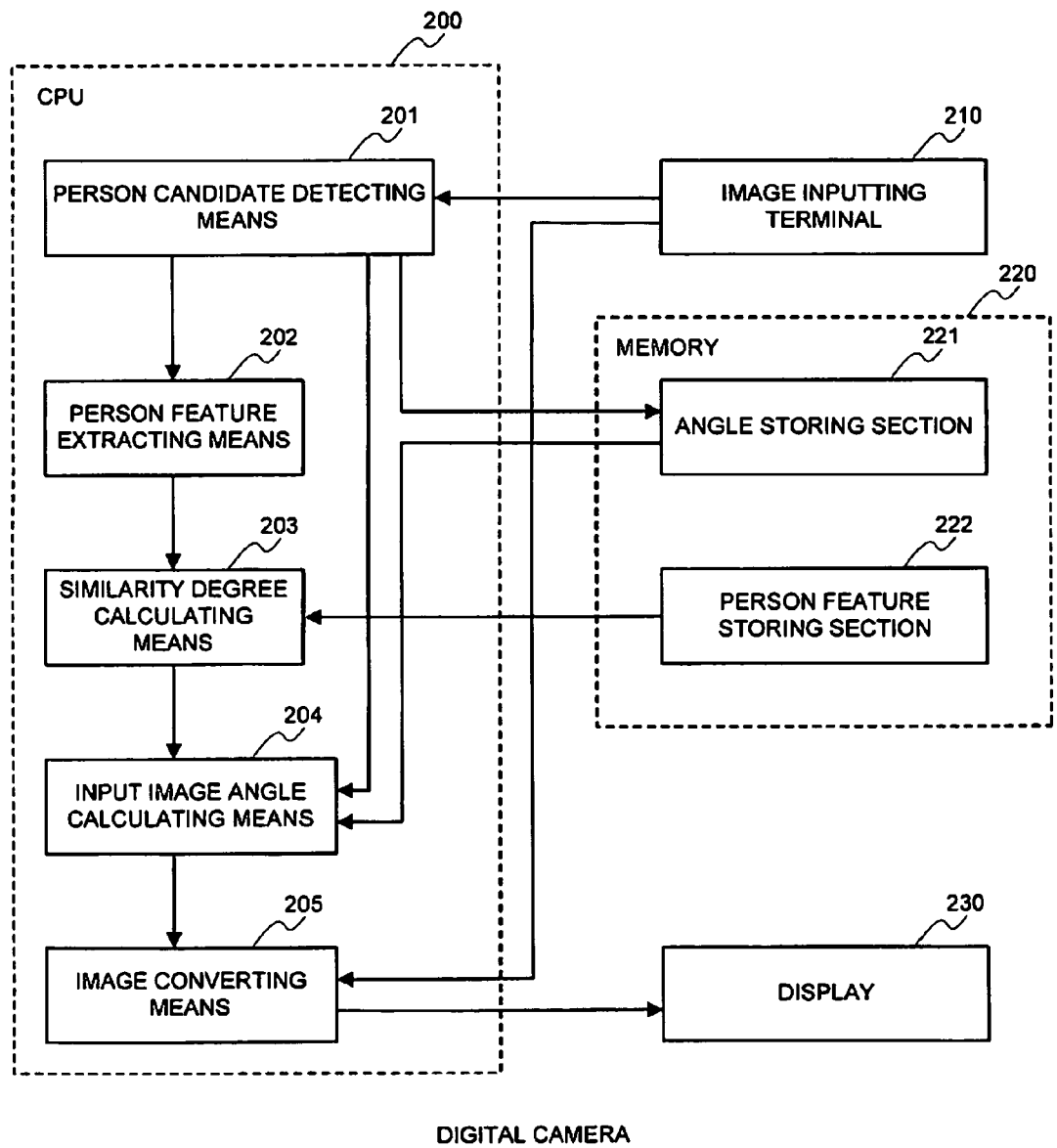
FIG. 15 is an explanatory view illustrating a configuration example of a second example.

Next, the mode for carrying out the present invention will be explained by employing a second example. This example corresponds to the second embodiment in accordance with the present invention. FIG. 15 is an explanatory view illustrating a configuration example of the image direction determining device applied to a digital camera as a second example. As shown in FIG. 15, the digital camera in this example includes a CPU as a data processing device 200, an image input terminal as an image inputting device 210, a memory as a storing device 220, and a display as an outputting means 230. Additionally, also in this example, the image direction determining device pre-stores the images of specific persons as a registered image, and determines the up-and-down direction of the input image when the image including the person has been inputted as an input image.

The CPU 200 operates according to the program, thereby to function as an object candidate detecting means 201, a feature extracting means 202, a similarity degree calculating means 203, and an input image angle calculating means 204, and an image converting means 205. Additionally, also in this example, similarly to the first example, the object candidate detecting means 201 operates as a person candidate detecting means 201 for detecting the person as an object candidate.

Further, the feature extracting means 202 operates as a person feature extracting means 202 for extracting the feature of the person candidate. Further, the similarity degree calculating means 203 calculates the similarity degree between each person candidate and the registration person being included in each registered image, and the input image angle calculating means 204 calculates the slant angle with respect to the up-and-down direction of the input image based upon each similarity degree in a combination of each person candidate and the registration person, and the angle of each person candidate.

Further, in this example, in addition hereto, the image converting means 205 converts the image signal being inputted from the image input terminal based upon the slant angle with respect to the up-and-down direction of the input image calculated by the input image angle calculating means, and generates a converted image. Further, the display 230 displays the converted image.

Further, the storage region that functions as the angle storing section 221 and the feature storing section 222 is allocated to the memory 220. Additionally, also in this example, similarly to the first example, the angle storing section 221 stores the angle in the input image of a person candidate detected by the person candidate detecting means 201 and the person candidate identifier for identifying the person candidate correspondingly to each other. Further, the feature storing section 222, which operates as a person feature storing section 222, stores the feature of a person (registration person) pre-extracted from the registered image, of which the up-and-down direction is known, and the registration person identifier for identifying the registration person correspondingly to each other.

The user can employ the pictures accumulated within the digital camera as a registered image. For example, by employing a family picture as a registered image and pre-storing the feature of each family extracted from the family picture in the person feature storing section 222 within the memory 220, when the user has taken a picture including the family as a subject again, he/her can confirm the picture of which the up-and-down direction has been corrected on the display 230 of the digital camera. With this, the user, which does not need to manually make an adjustment so that the up-and-down direction of the picture becomes a correct direction, can easily obtain the image of which the up-and-down direction is correct.

EXAMPLE 3

Figure 16:
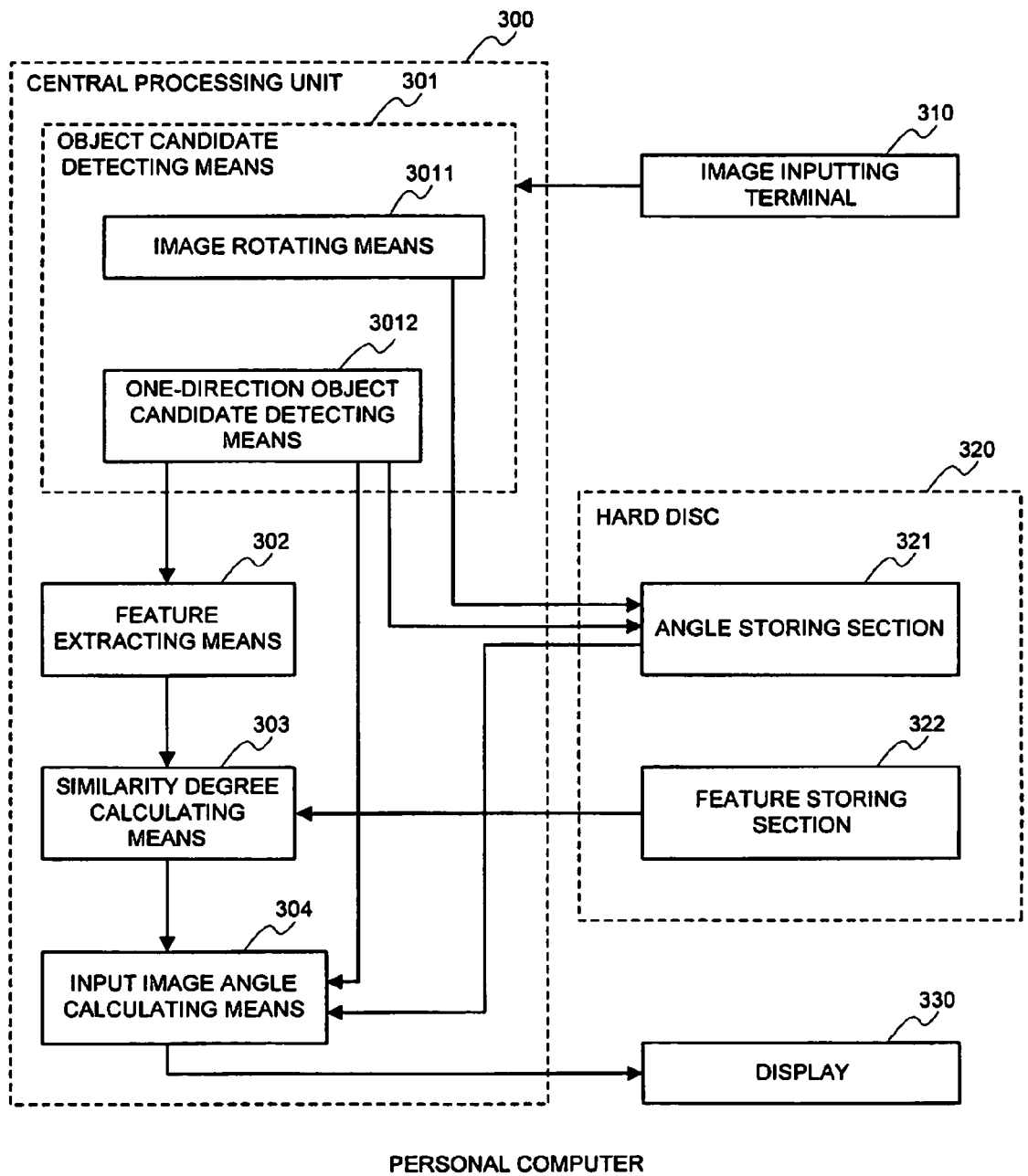
FIG. 16 is an explanatory view illustrating a configuration example of a third example.

Next, the mode for carrying out the present invention will be explained by employing a third example. This example corresponds to the third embodiment in accordance with the present invention. FIG. 16 is an explanatory view illustrating a configuration example of the image direction determining device applied to a personal computer as a third example. As shown in FIG. 16, the personal computer in this example includes a central processing unit as a data processing device 300, an image input terminal as an image inputting device 310, a hard disc as a storing device 320, and a display as an outputting device 330. Additionally, in this example, the image direction determining device seizes each rotation image as one object candidate, and determines the up-and-down direction of the input image based upon the similarity degree (for example, an arrangement relation of colors, edges, etc. within the image) between the feature of the entirety of the image and that of the pre-stored registered image.

The central processing unit 300 operates according to the program, thereby to function as an image rotating means 3011, a one-direction object candidate detecting means 3012, a feature extracting means 302, a similarity degree calculating means 303, and an input image angle calculating means 404. Additionally, in this example, from each rotation image, the one-direction object candidate detecting means 3012 detects the entirety of the image region of the rotation image as an object candidate. Further, the storage region that functions as the angle storing section 321 and the feature storing section 322 is allocated to the hard disc 320. In this example, the angle storing section 321 stores the rotation image identifier for identifying a rotation image, the rotation angle of the rotation image, the object candidate identifier for identifying an object candidate detected from the rotation image, and the angle in the input image of the object candidate. Further, the feature storing section 322 stores the feature of a pre-registered image (registered image), of which the up-and-down direction is known, and the registered image identifier for identifying the registered image correspondingly to each other.

Herein, it is assumed that the image has been inputted from the image input terminal 310. The central processing unit 300 generates a rotation image group by causing the image rotating means 3011 to rotate the input image at various angles. And, the central processing unit 300 outputs the generated rotation image group to the one-direction object candidate detecting means 3012, and stores the rotation angle of each rotation image in the angle storing section 321 within the hard disc 320. Various rotation angles are envisaged, whereas the picture with a slant of −90 degree, 0 degree, 90 degree, and 180 degree is standardizedly taken by use of the digital camera etc. Thus, in the standard package, the above-mentioned four kinds of the rotation images are generated.

The one-direction object candidate detecting means 3012 detects the entirety of an image region of each rotation image as an object candidate, and outputs the above image region and the angle in the input image of the object candidate (rotation image) being calculated from the rotation angle to the feature extracting means 302. Additionally, one rotation image or more is generated as a rotation image group without fail because the input image is, so to speak, a rotation image obtained by rotating the input image by 0 degree. Thus, in this example, a flag signal indicative of "An object exists" is outputted to the input image angle calculating means without fail because one rotation image or more is detected as an object candidate.

When the feature extracting means 302 receives the image region of each rotation image and its angle as an object candidate, it extracts a feature of each rotation image. Further, the feature extracting means 302 outputs the extracted feature of each rotation image to the similarity degree calculating means 303. As a feature, the method of employing the pixel value within the image region, the method of dividing the image region into rectangular blocks and employing information of a color or an edge extracted from each block, the method of region-dividing the image region according to image characteristics such as a color and an edge, and employing information of an arrangement on the image of each region, or the like can be listed. Additionally, the arrangement information of each region can be expressed, as one example, with a two-dimensional vector in which the image gravity is located at a start point and the region gravity at an end point, and a three-dimensional arrangement vector being configured of information of main colors of the region.

At this time, the arrangement information of the image being configured of N regions can be expressed with N arrangement vectors.

The similarity degree calculating means 303 calculates the similarity degree between the feature of each rotation image being inputted from the feature extracting means 302 and that of each registered image registered into the feature storing section 322 within the hard disc 320. As one example, the method will be explained of calculating the similarity degree in the case of having inputted a landscape picture including the sky and the ground as a registered image, and a landscape picture including the sky and the ground as an input image similarly to the registered image. In this example, as a feature, the three-dimensional arrangement vector representing the arrangement information of each color region on the image is employed. It is assumed that the arrangement vector signifying that a blue-sky region is arranged in an upper side of the image and a brown ground region is arranged in a lower side of the image has been stored as a feature pre-extracted from the registered image in the feature storing section 322 within the hard disc 320. On the other hand, the three-dimensional arrangement vector signifying the arrangement information of each color region is calculated as a feature also from each rotation image generated based upon the input image with the similar method. Upon calculating the similarity degree between the arrangement vector of the registered image and that of the rotation image for a combination of each rotation image and the registered image, for the rotation image from which the arrangement vector such that the sky region is arranged in the upper side and the ground region is arranged in the low side has been extracted, the highest similarity degree to the registered image is obtained.

The similarity degree calculating means 303 compares a color ingredient of the arrangement vector of each region in the registered image and that of the arrangement vector of each region in the rotation image, and determines that a pair of the regions each having a difference value equal to or less than a constant value is identical to each other as a color region. And, by obtaining a difference of the position ingredient of the arrangement vector for a combination of the regions each determined to be an identical color region, thereby to define a function such that a high similarity degree is calculated as the difference becomes small, the similarity degree can be calculated.

The input image angle calculating means 304 carries out weighting for the angle in the input image of each rotation image based upon the similarity degree to the registered image, and calculates the slant angle with respect to the up-and-down direction of the input image by employing the weighted angle. Additionally, the input image angle calculating means 304 can employ the various techniques, for example, the method of employing the angle of the rotation image of which the obtained similarity degree is highest, and the method of employing an average value of the angles of the rotation images of which the similarity degree is equal to or more than a constant.

The display 330 outputs the slant angle with respect to the up-and-down direction of the input image calculated by the input image angle calculating means. The user can grasp the up-and-down direction of the input image based upon the slant angle with respect to the up-and-down direction of the input image displayed on the display.

EXAMPLE 4

Figure 17:
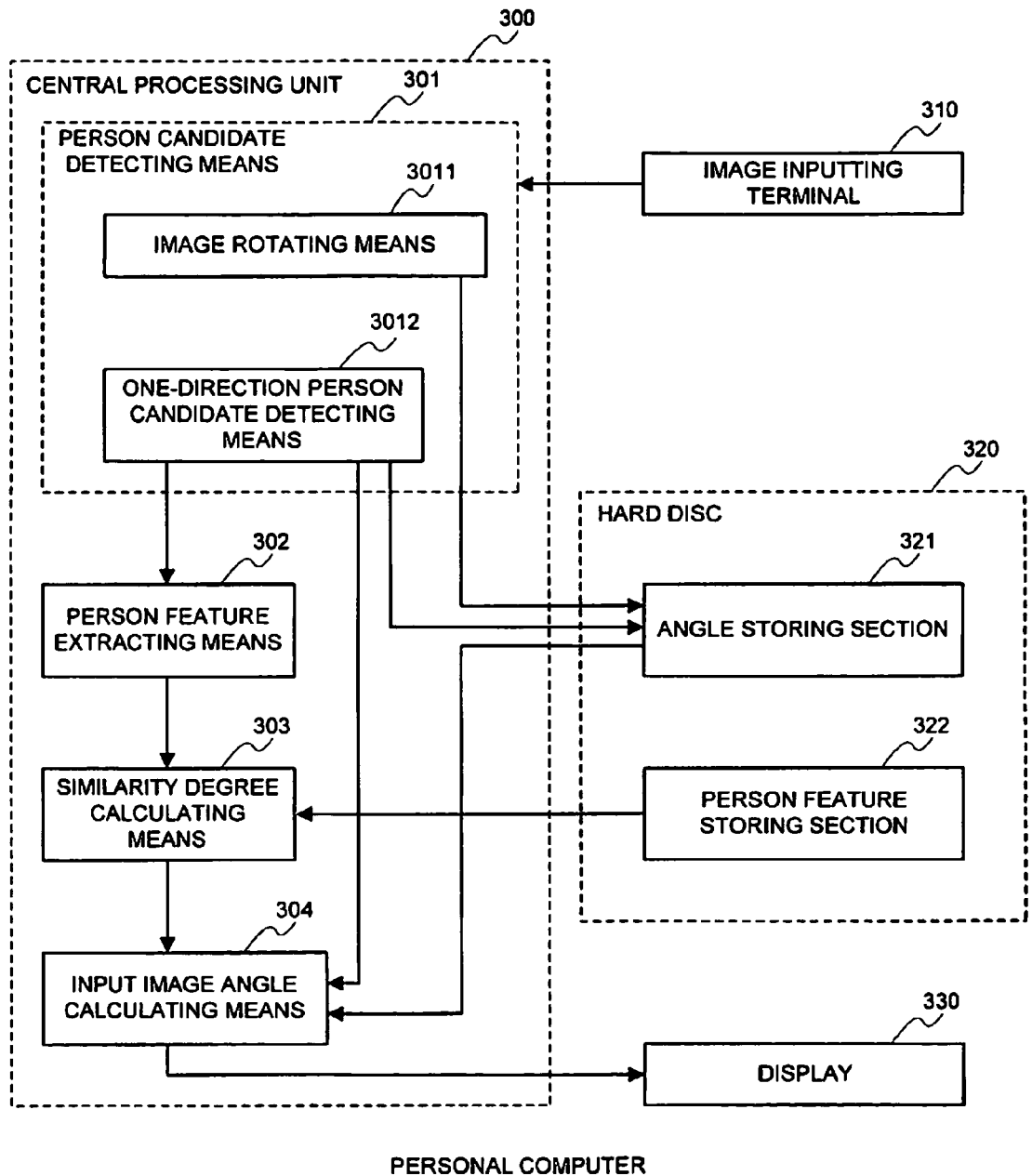
FIG. 17 is an explanatory view illustrating a configuration example of a fourth example.

Next, the mode for carrying out the present invention will be explained by employing a fourth example. This example, similarly to the third example, corresponds to the third embodiment in accordance with the present invention. In this example, an example is shown of utilizing the image direction determining device for the up-and-down determination of the input image including the person as an object. FIG. 17 is an explanatory view illustrating a configuration example of the image direction determining device applied to a personal computer as a fourth example. As shown in FIG. 17, the personal computer in this example includes a central processing unit as a data processing device 300, an image input terminal as an image inputting device 310, a hard disc as a storing device 320, and a display as an outputting means 330.

The central processing unit 300 operates according to the program, thereby to function as an image rotating means 3011, a one-direction object candidate detecting means 3012, a feature extracting means 302, a similarity degree calculating means 303, and an input image angle calculating means 304, and an image converting means 305. Additionally, in this example, the one-direction object candidate detecting means 3012 operates as a one-direction person candidate detecting means 3012 for detecting the person candidate of which the angle in the rotation image is 0 degree from each rotation image. Further, the feature extracting means 302 operates as a person feature extracting means 302 for extracting the feature of the person candidate. Further, the similarity degree calculating means 303 calculates the similarity degree between each person candidate and the registration person being included in each registered image. Further, the input image angle calculating means 304 calculates the slant angle with respect to the up-and-down direction of the input image based upon each similarity degree in a combination of each person candidate and the registration person, and the angle of each person candidate.

Further, the storage region that functions as the angle storing section 321 and the feature storing section 322 is allocated to the hard disc 320. Additionally, in this example, the angle storing section 321 stores the rotation image identifier for identifying the rotation image generated by the image rotating means 3011 and its rotation angle correspondingly to each other, and the angle in the input image of a person candidate detected by the one-direction person candidate detecting means 3012 and the person candidate identifier for identifying the person candidate correspondingly to each other. Further, the feature storing section 322, which operates as a person feature storing section 322, stores the feature of a person (registration person) pre-extracted from the registered image, of which the up-and-down direction is known, and the registration person identifier for identifying the registration person correspondingly to each other.

Herein, it is assumed that the image has been inputted from the image input terminal 310. The central processing unit 300 causes the image rotating means 3011 to rotate the input image at various angles, and generates a rotation image group. And, the central processing unit 300 outputs the generated rotation image group to the one-direction person candidate detecting means 3012, and stores the rotation angle of each rotation image in the angle storing section within the hard disc.

The one-direction person candidate detecting means 3012 detects the person candidate of which the angle in the rotation image is 0 degree from each rotation image. The one-direction person candidate means 3012, when the person candidate has been detected, outputs a flag signal indicative of "A person exists" to the input image angle calculating means 304, and stores the angle in the input image of each person candidate in the angle storing section 321 within the hard disc 320. Further, it outputs the image region of each person candidate and its angle to the person feature extracting means. Additionally, the one-direction person candidate detecting means 3012, when the person candidate has not been detected, outputs a flag signal indicative of "No person exists" to the input image angle calculating means 304. Additionally, an operation after it is similar to that of the first example, so its explanation is omitted.

The user can grasp the up-and-down direction of the input image based upon the slant angle with respect to the up-and-down direction of the image displayed on the display 330.

EXAMPLE 5

Figure 18:
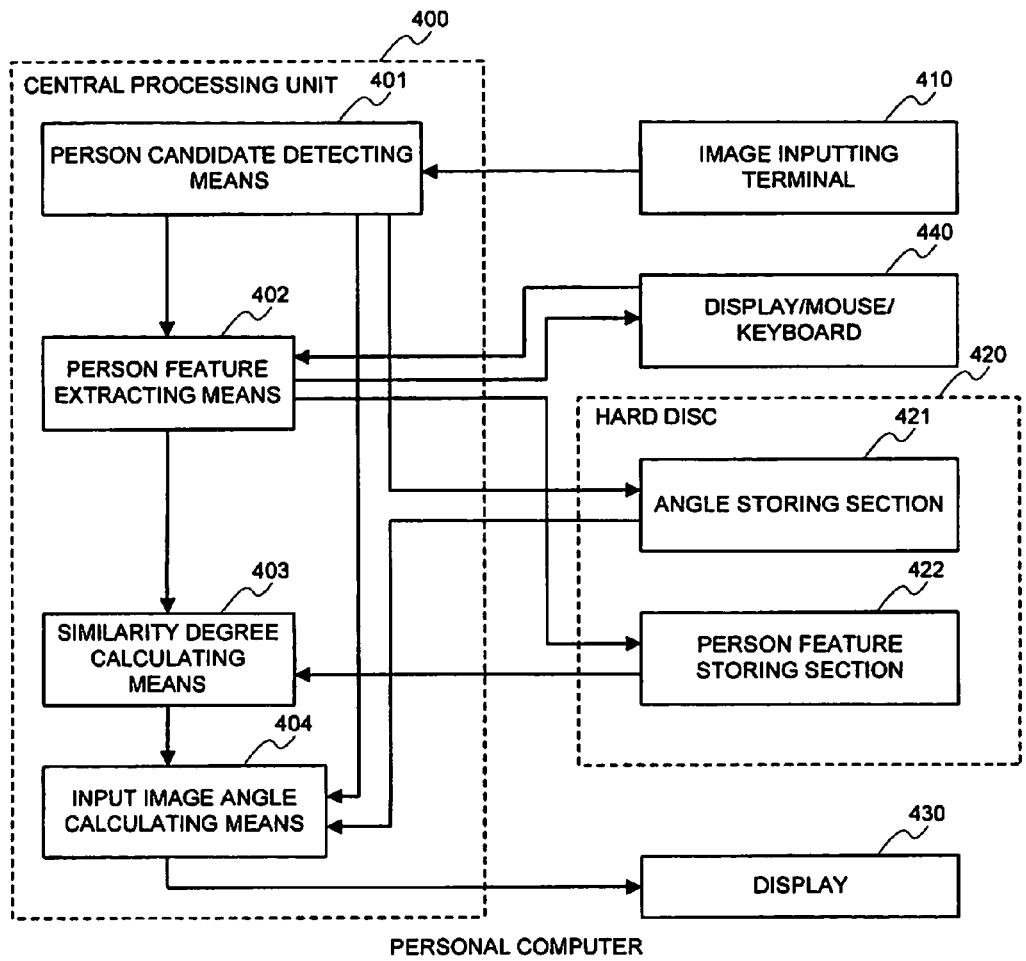
FIG. 18 is an explanatory view illustrating a configuration example of a fifth example.
Figure 19:
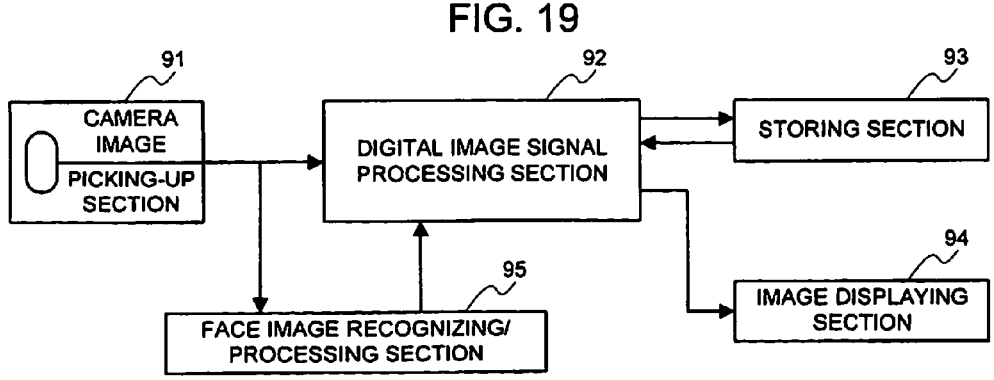
FIG. 19 is an explanatory view illustrating one example of the conventional image direction determining device for determining an up-and-down direction of the image by use of an up-and-down direction of the face.

Next, the mode for carrying out the present invention will be explained by employing a fifth example. This example corresponds to the fourth embodiment in accordance with the present invention. FIG. 18 is an explanatory view illustrating a configuration example of the image direction determining device applied to a personal computer as a fifth example. As shown in FIG. 18, the personal computer in this example includes a central processing unit as a data processing device 400, an image input terminal as an image inputting device 410, a hard disc as a storing device 420, a display as an outputting means 430, and a mouse, a keyboard and display as a command inputting/outputting device 440. This example as well is an example of utilizing the image direction determining device for the up-and-down determination of the input image including the person as an object.

The central processing unit 400 operates according to the program, thereby to function as an object candidate detecting means 401, a feature extracting means 402, a similarity degree calculating means 403, and an input image angle calculating means 404. Further, the storage region that functions as a angle storing section 421 and a feature storing section 422 is allocated to the hard disc 420. Additionally, in this example, a process other than the process relating to the command inputting/outputting device 440 is similar to that of the first example, so its explanation is omitted.

Herein, it is assumed that the image has been inputted from the image input terminal 410. Further, it is assumed that, at that moment, a signal indicative of "A registered image" has been inputted via the display 440 and the keyboard 440 responding to a user's operation. For example, a message "The inputted image is a registered image. (Y/N)" or the like is displayed on the display, and the user input-operates "Y" via the keyboard according to the display.

The person feature extracting means 402, upon receipt of a flag signal indicative of "A registered image", outputs the image region of the person candidate detected by the person candidate detecting means 401, and the angle in the input image to the display 440. The user confirms the image region and its angle displayed on the display 440, and modifies the image region and the angle if they are erroneous from a viewpoint of the registration person. As one example of modifying the image region of the registration person, the user can realize modification of the image region of the registered image by deleting the image region displayed on the display 440 with a delete key selected by the mouse in some cases when the person region that should be registered is not included therein, by designating and cutting off one part of the person region with the mouse in some cases when the portion other than the person region, for example, the background is partially included therein, and by designating the insufficient region with the mouse for addition in some cases when one part of the person region is lacking. Further, as one example of modifying the angle, the user can modify the angle by confirming an arrow signifying the up-and-down direction of the person displayed on the display and inputting the angle via the keyboard so that the arrow points to a correct up-and-down direction of the person.

The person feature extracting means 402, when the person region and the angle are modified via the display 440, the mouse 440, and the keyboard 440, extracts the feature of the person based upon the modified image region and angle in the input image, and stores it in the person feature storing section 422.

Additionally, when the person feature extracting means 402 does not receive a flag signal indicative of "A registered image", it performs a process similar to that of the first example. As an example in the case that it does not receive a flag signal indicative of "A registered image", a message "The inputted image is a registered image. (Y/N)" or the like is displayed on the display 440, and the user inputs "N" via the keyboard according to the display. Or, when the input operation has not been performed via the mouse 440 or the keyboard 440 notwithstanding a lapse of a constant time after the person feature extracting means 402 received information associated with the person candidate from the person candidate detecting means 401, the person feature extracting means 402 may determine that a flag signal indicative of "A registered image" has not been received.

HOW THE INVENTION IS CAPABLE OF INDUSTRIAL EXPLOITATION

The present invention is applicable to the fields, for example, an image reading device for correcting and reading the up-and-down directions of the pictures taken with the digital camera slanted at various angles and the scanner images incorporated into a computer at various angles without bothering the user, and a program for applying the image reading device to the computer or the digital camera. Further, the present invention is applicable to the fields as well, for example, a camera shake correcting device for correcting the video including camera shake photographed with a digital video etc. and generating the video with the up-and-down direction of each frame set to an identical direction, and a program for applying the camera shake correcting device to the computer or the digital video.

This application is based upon and claims the benefit of priority from Japanese patent application No. 2006-158253, filed on Jun. 7, 2006, the disclosure of which is incorporated herein in its entirety by reference.

The invention claimed is:

1. An image direction determining device for determining an up-and-down direction of an input image, comprising:
   an object candidate detecting means for detecting an object having a fixed shape or arrangement, of which a definite slant angle with respect to the up-and-down direction can be detected, and of which a definite angle can be detected from its shape or arrangement, as an object candidate from the input image;
   a similarity degree calculating means for calculating a degree of similarity between the object candidate detected by the object candidate detecting means and a pre-stored registration object; and
   an up-and-down direction determining means for performing weighted averaging of the slant angles with respect to the up-and-down direction in input images of the object candidates detected by the object candidate detecting means with the similarity calculated by the similarity degree calculating means assumed to be a weight, and outputting its weighted average as a slant degree with respect to the up-and-down direction of the input image.

2. An image direction determining device according to claim 1, wherein:
   the image direction determining device comprises a feature extracting means for extracting a feature of the object candidate detected by the object candidate detecting means based upon image data of an object candidate region within the input image;
   the object candidate detecting means detects a plurality of the object candidates from the input image, and extracts angles of the detected object candidates in the input image;
   the similarity degree calculating means compares the feature of each object candidate extracted by the feature extracting means with that of the pre-stored registration object, thereby to calculate the similarity degree; and
   the up-and-down direction determining means calculates the slant angle of the input image with respect to the up-and-down direction using the average of the slant angles with respect to the up-and-down direction of the object candidates detected by the object candidate detecting means weighted with the similarity calculated by the similarity degree calculating means.

3. An image direction determining device according to claim 1, wherein the object candidate detecting means, from a rotated image obtained by rotating the input image at a predetermined angle, detects the object candidate of which the angle in the rotated image is 0 degree, and calculates the angle in the input image of the object candidate using the rotation angle of the rotated image.

4. An image direction determining device according to one of claim 1, wherein the similarity degree calculating means calculates the degree of similarity between each object candidate detected by the object candidate detecting means and each pre-stored registration object.

5. An image direction determining device according to claim 2, wherein:
   the feature extracting means extracts a feature of which a value changes responding to a direction of the object; and
   the similarity degree calculating means calculates the degree of similarity by employing a feature of which a value changes responding to a direction of the object, the feature extracted by the feature extracting means.

6. An image direction determining device according to claim 2, wherein the up-and-down direction determining means, when the object candidate is not detected from the input image, assumes the slant angle of the input image with respect to the up-and-down direction to be 0 degree.

7. An image direction determining device according to claim 2, wherein up-and-down direction determining means, when the object candidate has been detected from the input image, calculates the slant angle of the input image with respect to the up-and-down direction using the angle of the detected object candidate of which the degree of similarity to the pre-stored registration object is the highest.

8. An image direction determining device according to claim 2, wherein the up-and-down direction determining means, when the object candidate has been detected from the input image, calculates the slant angle of the input image with respect to the up-and-down direction of the input image is the average of the every slant angle of the detected object candidate of which the degree of similarity to the pre-stored registered object is equal to or more than a predetermined threshold.

9. An image direction determining device according to claim 1, wherein the up-and-down direction determining means, when the object candidate has been detected from the input image, calculates the slant angle of the input image with respect to the up-and-down direction using the angles of the every detected object candidate of which the similarity to the pre-stored registered object is equal to or more than a predetermined threshold.

10. An image direction determining device according to claim 2, wherein the up-and-down direction determining means, when the object candidate has been detected from the input image, calculates the slant angle of the input image with respect to the up-and-down direction using the angles of the detected object candidates weighted with the degree of similarity between the detected object candidates and the pre-stored registered object.

11. An image direction determining device according to claim 6, wherein the up-and-down direction determining means selects the angle nearest to the calculated slant angle of the input image with respect to the up-and-down direction as the slant angle of the input image with respect to the up-and-down direction out of 0 degree, 90 degree, 180 degree, and 270 degree.

12. An image direction determining device according to claim 1, wherein the object candidate detecting means holds relative position data of a specific part of a predetermined object, and detects the object candidate using a similarity between the held relative position data and relative position data of the specific part detected from the input image.

13. An image direction determining device according to claim 1, wherein the object candidate detecting means holds a feature of a predetermined object, and detects the object candidate using a similarity between the held feature and the feature extracted from the input image.

14. An image direction determining device according to claim 1, wherein the object candidate detecting means holds the image including a predetermined object as a template, and detects the object candidate through template matching with held template.

15. An image direction determining device according to claim 14, using the image of the pre-stored object as a template for detecting the object candidate.

16. An image direction determining device according to claim 1 comprising a person feature storing means for storing information indicative of a specific person as a registered object.

17. An image direction determining device according to claim 16, wherein the object candidate detecting means detects a human face candidate of a person as an object candidate.

18. An image direction determining device according to claim 17, wherein the object candidate detecting means extracts an angle that is formed by a perpendicular bisector of a straight line connecting an left eye and a right eye to a perpendicular direction as an angle in the input image of the detected human face candidate.

19. An image direction determining device according to claim 2, wherein:
the object candidate detecting means comprises a person candidate detecting means for detecting a plurality of person candidates included in the input image, and extracting angles of the detected person candidates in the input image;
the feature extracting means extracts the feature of the person candidate detected by the person candidate detecting means;
the similarity degree calculating means calculates the degree of similarity between the feature extracted by the feature extracting means and the feature of the pre-stored specific person for each person candidate detected by the person candidate detecting means; and
the up-and-down direction determining means calculates the slant angle of the input image with respect to the up-and-down direction using the angle of each person candidate extracted by the person candidate detecting means and the degree of similarity to the specific person calculated by the similarity degree calculating means.

20. An image direction determining method of determining an up-and-down direction of an input image, comprising the steps of:
detecting an object having a fixed shape or arrangement, of which a definite slant angle with respect to the up-and-down direction can be detected, and of which a definite angle can be detected from its shape or arrangement, as an object candidate from the input image;
calculating a degree of similarity between the detected object candidate and a pre-stored registered object; and
performing weighted averaging of the slant angles with respect to the up-and-down direction in input images of the object candidates with the calculated degree of similarity assumed to be a weight, and outputting its weighted average as a slant degree with respect to the up-and-down direction of the input image.

21. An image direction determining method according to claim 20, comprising the steps of:
detecting a plurality of the object candidates from the input image, and extracting the angles of the detected object candidates in the input image;
extracting a feature of each detected object candidate based upon image data of an object candidate region within the input image;
comparing the extracted feature of each object candidate with the feature of the pre-stored registered object, thereby to calculate the similarity degree; and
calculating the slant angle of the input image with respect to the up-and-down direction using the average of the slant angles with respect to the up-and-down direction of the object candidates weighted with the calculated degree of similarity.

22. A non-transitory computer readable medium storing an image direction determining program for determining an up-and-down direction of an input image, the image direction determining program causing a computer to execute the processes of:
detecting an object having a fixed shape or arrangement, of which a definite slant angle with respect to the up-and-down direction can be detected, and of which a definite angle can be detected from its shape or arrangement, as an object candidate from the input image;
calculating a degree of similarity between the detected object candidate and a pre-stored registered object; and
performing weighted averaging of the slant angles with respect to the up-and-down direction in input images of the object candidates with the calculated degree of similarity assumed to be a weight, and outputting its weighted average as a slant degree with respect to the up-and-down direction of the input image.

23. The non-transitory computer readable medium according to claim 22, the image direction determining program causing the computer to execute the processes of:
detecting a plurality of the object candidates from the input image, and extracting angles of the detected object candidates in the input image;

extracting a feature of each detected object candidate based upon image data of an object candidate region within the input image;

comparing the extracted feature of each object candidate with the feature of the pre-stored registered object, thereby to calculate the degree of similarity; and calculating the slant angle of the input image with respect to the up-and-down direction using the average of the slant angles of the object candidates with respect to the up-and-down direction weighted with the calculated degree of similarity.

24. An image direction determining device according to claim 2, wherein the up-and-down direction determining means, when the object candidate has been detected from the input image, calculates the slant angle of the input image with respect to the up-and-down direction using the average of the slant angles of the detected object candidates weighted with the degree of similarity between the detected object candidates and the pre-stored registered object.

25. An image direction determining method according to claim 21, wherein the calculating step, when the object candidate has been detected from the input image, calculates the slant angle of the input image with respect to the up-and-down direction using the average of the slant angles of the detected object candidates weighted with the area of the detected object and the degree of similarity between the detected object candidates and the pre-stored registered object.

* * * * *

UNITED STATES PATENT AND TRADEMARK OFFICE
CERTIFICATE OF CORRECTION

PATENT NO.       : 8,548,254 B2
APPLICATION NO. : 12/308051
DATED            : October 1, 2013
INVENTOR(S)      : Ishikawa et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1152 days.

Signed and Sealed this

Fifteenth Day of September, 2015

Michelle K. Lee
*Director of the United States Patent and Trademark Office*